United States Patent
Wang et al.

(10) Patent No.: US 9,582,329 B2
(45) Date of Patent: Feb. 28, 2017

(54) PROCESS SCHEDULING TO IMPROVE VICTIM CACHE MODE

(71) Applicant: QUALCOMM Incorporated, San Diego, CA (US)

(72) Inventors: Feng Wang, San Diego, CA (US); George Patsilaras, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 14/623,554

(22) Filed: Feb. 17, 2015

(65) Prior Publication Data

US 2016/0239344 A1    Aug. 18, 2016

(51) Int. Cl.
  *G06F 9/54*   (2006.01)
  *G06F 9/50*   (2006.01)
  *G06F 12/08*  (2016.01)

(52) U.S. Cl.
  CPC .......... *G06F 9/5016* (2013.01); *G06F 9/5088* (2013.01); *G06F 12/084* (2013.01); *G06F 2209/502* (2013.01); *G06F 2212/1024* (2013.01)

(58) Field of Classification Search
  CPC .................. G06F 9/5016; G06F 12/084; G06F 2212/1024

See application file for complete search history.

(56) References Cited

U.S. PATENT DOCUMENTS 6,769,017 B1 * 7/2004 Bhat ..................... G06F 9/5033
                                                    709/214
7,093,258 B1   8/2006 Miller et al.
(Continued)

FOREIGN PATENT DOCUMENTS

WO    2011070506 A2   6/2011

OTHER PUBLICATIONS

Chishti Z., et al., "Optimizing Replication, Communication, and Capacity Allocation in CMPs", Computer Architecture, 2005, ISCA '05, Proceedings, 32nd International Symposium on Madison, WI, USA Jun. 4-8, 2005, Piscataway, NJ, USA,IEEE, Jun. 4, 2005 (Jun. 4, 2005), pp. 357-368, XP010807919, ISBN: 978-0-7695-2270-8.

(Continued)

*Primary Examiner* — Syed Roni
(74) *Attorney, Agent, or Firm* — The Marbury Law Group, PLLC

(57) ABSTRACT

Aspects include computing devices, systems, and methods for implementing scheduling an execution process to an execution processor cluster to take advantage of reduced latency with a victim cache. The computing device may determine a first processor cluster with a first remote shared cache memory having an available shared cache memory space. To properly schedule the execution process, the computing device may determine a second processor cluster with a lower latency to the first remote shared cache memory than an execution processor cluster scheduled with the execution process. The second processor cluster may be scheduled the execution process, thus becoming the execution processor cluster, based on a size of the available shared cache memory space and the latency of the second processor cluster to the first remote shared cache memory. The available shared cache memory space may be used as the victim cache for the execution process.

20 Claims, 14 Drawing Sheets

(56) References Cited

U.S. PATENT DOCUMENTS

| | | |
|---|---|---|
| 7,143,412 B2 | 11/2006 | Koenen |
| 7,496,712 B1 | 2/2009 | O'Krafka et al. |
| 8,069,308 B2 | 11/2011 | Larson et al. |
| 2003/0088608 A1* | 5/2003 | McDonald ............ G06F 9/4881 718/106 |
| 2008/0155197 A1* | 6/2008 | Li ........................ G06F 9/4843 711/130 |
| 2014/0007114 A1 | 1/2014 | Wang et al. |
| 2014/0059554 A1 | 2/2014 | Campbell et al. |
| 2014/0189239 A1 | 7/2014 | Hum et al. |

OTHER PUBLICATIONS

International Search Report and Written Opinion—PCT/US2016/012023—ISA/EPO—Jun. 1, 2016.

\* cited by examiner

PROCESS SCHEDULING TO IMPROVE VICTIM CACHE MODE

BACKGROUND

The increasing demand for performance and features in a broad array of computing devices has led manufactures to include multiple central processor units (CPUs) in computing devices to handle a greater number of capabilities and heavier workloads while executing faster than previous generations. Some architectures include CPUs arranged into clusters for executing different tasks and supporting different capabilities. A computing device may include a multi-cluster CPU system to handle the demands of the software and subsystems of the computing device. The number of CPUs can only advance the performance of the computing device if the CPUs can access stored code and data with speeds comparable to their processing speed. Too many CPUs requesting access to a cache memory can cause a performance bottleneck.

To avoid creating this performance bottleneck, each CPU cluster may include its own cache memory, for example an L2 cache. In many instances, not all of the CPU clusters of a computing device may be active, or the cache of a CPU cluster may not be fully utilized. Existing cache coherency protocols support sharing of data among L2 caches of different CPU clusters. However, these cache coherency protocols fail to fully exploit the available L2 cache resources in the multi-cluster CPU system. The preferred L2 cache to be leveraged for supporting other active CPU clusters would be the L2 cache of the multi-cluster CPU system having both the lowest latency and the highest availability. This preferred circumstance is not always present when looking to leverage other L2 cache resources for a CPU cluster. Further, even combining the highest availability and lowest latency may not provide the combination with the best performance results.

SUMMARY

The methods and apparatuses of various aspects provide circuits and methods for scheduling an execution process to an execution processor cluster to take advantage of reduced latency with a victim cache. Aspect methods may include determining a first processor cluster with a first remote shared cache memory having an available shared cache memory space, determining a second processor cluster with a lower latency to the first remote shared cache memory than a first execution processor cluster scheduled with the execution process, scheduling the execution process to the second processor cluster as a second execution processor cluster based on a size of the available shared cache memory space and the latency of the second processor cluster to the first remote shared cache memory, and using the available shared cache memory space as the victim cache for the execution process.

In an aspect, determining a first processor cluster with a first remote shared cache memory having an available shared cache memory space may include determining the first processor cluster with the first remote shared cache memory having a highest amount of available shared cache memory space, determining a second processor cluster with a lower latency to the first remote shared cache memory than a first execution processor cluster scheduled with the execution process may include determining the second processor cluster with a lowest latency to the first remote shared cache memory, and scheduling the execution process to the second processor cluster as a second execution processor cluster based on a size of the available shared cache memory space and the latency of the second processor cluster to the first remote shared cache memory may include scheduling the execution process to the second processor cluster as a second execution processor cluster based on the second processor cluster having the lowest latency to the first remote shared cache memory having the highest amount of available shared cache memory space.

An aspect method may further include determining whether a process is scheduled for the second processor cluster, and scheduling the process to the first execution processor cluster as a third processor cluster in response to determining that the process is scheduled for the second processor cluster.

An aspect method may further include determining a third processor cluster with a second remote shared cache memory having a highest amount of available shared cache memory space wherein the second remote share cache memory includes any remote shared cache memory other than the first remote shared cache memory, determining a fourth processor cluster having a lowest latency to the second execution processor cluster wherein the fourth processor cluster includes any processor cluster other than the first processor cluster, scheduling a process scheduled for the third processor cluster to the fourth processor cluster, and using the highest amount of available shared cache memory space as part of the victim cache for the execution process.

An aspect method may further include determining whether a process is scheduled for the fourth processor cluster, and scheduling the process to the third processor cluster in response to determining that the process is scheduled for the fourth processor cluster.

An aspect includes a computing device, having a plurality of processor clusters communicatively connected to each other, a first execution processor cluster of the plurality of processor clusters assigned an execution process, a plurality of shared cache memories each communicatively connected to at least one of the plurality of processors, and a processor communicatively connected to the plurality of processor clusters and configured with processor-executable instructions to perform operations of one or more aspect methods described above.

An aspect includes a computing device having means for performing the functions of one or more aspect methods described above.

An aspect includes a non-transitory processor-readable medium having stored thereon processor-executable instructions configured to cause a processor to perform operations of one or more aspect methods described above.

BRIEF DESCRIPTION OF THE DRAWINGS

The accompanying drawings, which are incorporated herein and constitute part of this specification, illustrate example aspects of the invention, and together with the general description given above and the detailed description given below, serve to explain the features of the invention.

DETAILED DESCRIPTION

Figure 1:
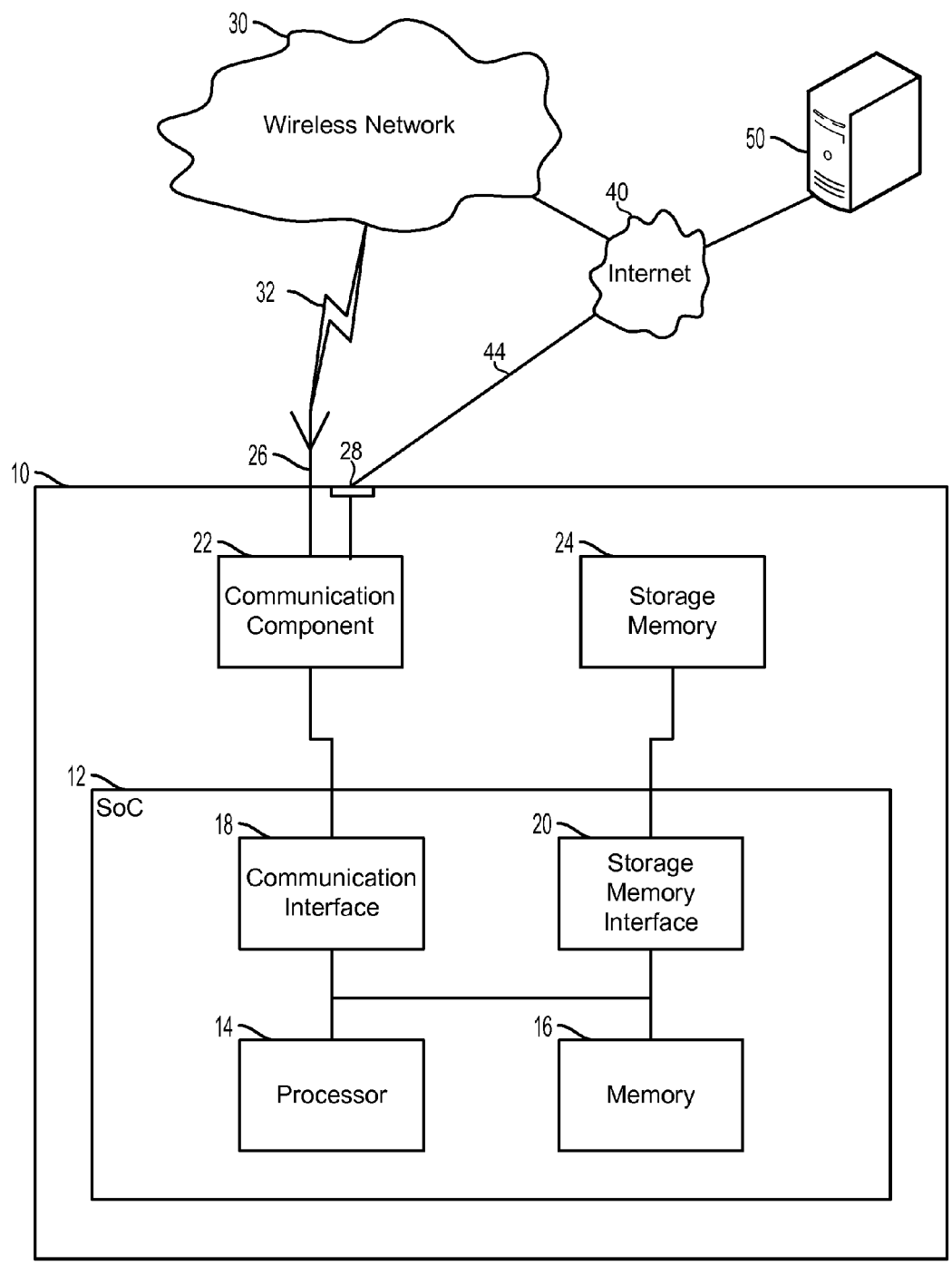
FIG. 1 is a component block diagram illustrating a computing device suitable for implementing an aspect.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The terms "computing device" and "mobile computing device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices that include a memory, and a multi-core programmable processor. A computing device includes one or more processors within the computing device, and thus a reference to a computing device performing an operation encompasses one or more processors within the device performing the operation. While the various aspects are particularly useful for mobile computing devices, such as smartphones, which have limited memory and battery resources, the aspects are generally useful in any electronic device that implements a plurality of memory devices and a limited power budget in which reducing the power consumption of the processors can extend the battery-operating time of the mobile computing device.

The term "system-on-chip" (SoC) is used herein to refer to a set of interconnected electronic circuits typically, but not exclusively, including a hardware core, a memory, and a communication interface. A hardware core may include a variety of different types of processors, such as a general purpose processor, a central processing unit (CPU), a digital signal processor (DSP), a graphics processing unit (GPU), an accelerated processing unit (APU), an auxiliary processor, a single-core processor, and a multi-core processor. A hardware core may further embody other hardware and hardware combinations, such as a field programmable gate array (FPGA), an application-specific integrated circuit (ASCI), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

Aspects include methods and computing devices implementing such methods for improved exploitation of available cache resources in a multi-cluster CPU system. The various aspects may apply to any type of cache memory (e.g., L1 cache memory, L2 cache memory, L3 cache memory, L4 cache memory, etc.), and therefore references to L2 cache memory are used for ease of explanation as an example type of cache memory and are not meant to limit the scope of the claims unless specifically recited. In an aspect, cache resource exploitation may be improved by selecting remote L2 cache memories for use as victim caches for processes with high L2 cache demands. Aspects may improve the effectiveness of a victim cache mode using the L2 cache memory of one or more other processor clusters.

An aspect may improve the use of available L2 cache resources in a multiple processor cluster system by migrating a process with high L2 cache demands to a processor cluster that is closer to threads or processes with low L2 cache requirements, thereby improving the effectiveness and latency of a victim cache mode.

In a multiple processor cluster system, available L2 caches may be distributed across multiple processor clusters. In an aspect, the multiple processor cluster system may be configured to determine the relationships between the multiple processor clusters and the available L2 caches. The multiple processor cluster system may determine an L2 cache with high availability. Processes may then be scheduled to processors considering their needs for sharing L2 resources. A process with a high L2 cache demand may be migrated to a processor cluster that is closer to a processor cluster executing threads having low L2 cache requirements. A processor executing threads with low L2 cache requirements may have an associated L2 cache with high availability for use as a victim cache. Moving the high-cache process to a processor closer to a processor cluster with high L2 cache availability may also reduces the physical distance between the processor cluster executing the process and the L2 victim cache, thereby reducing the latency. The processor cluster executing the high-cache requirement thread then may use the L2 cache associated with the processor cluster with low cache requirements as a remote victim cache.

Multiple remote victim caches may be implemented to aid in the execution of the process. The process may be migrated to a first processor cluster which may be closer to a second processor cluster and a third processor cluster, each having relatively high levels of available L2 cache memory, in order to reduce latency because of their proximity to the first processor cluster. In an aspect, the first processor cluster may be selected for scheduling the process based on a combination of (1) latency in accessing a remote L2 cache(s) associated with another processor cluster(s), and (2) a level of availability of the remote L2 cache(s). In other words, the processor selection may be based on reducing the latency and increasing the availability of the remote L2 cache(s).

Reducing the latency and increase the availability of the remote L2 cache memories for use as a remote victim cache may reduce the number of cache misses, resulting in less access to the main memory, reduced bandwidth usage, reduced memory access conflicts, and improve performance. This may increase the performance of executing the process because the access to stored information is faster and less susceptible to delays or interruptions. Also, reducing the power consumed by using the remote L2 cache memories may improve the performance by avoiding performance degradation caused by various processor states.

FIG. 1 illustrates a system including a computing device 10 in communication with a remote computing device 50 suitable for use with the various aspects. The computing device 10 may include an SoC 12 with a processor 14, a memory 16, a communication interface 18, and a storage memory interface 20. The computing device may further include a communication component 22 such as a wired or wireless modem, a storage memory 24, an antenna 26 for establishing a wireless connection 32 to a wireless network 30, and/or the network interface 28 for connecting to a wired connection 44 to the Internet 40. The processor 14 may include any of a variety of hardware cores, as well as a number of processor cores. The SoC 12 may include one or more processors 14. The computing device 10 may include more than one SoCs 12, thereby increasing the number of processors 14 and processor cores. The computing device 10 may also include processor 14 that are not associated with an SoC 12. Individual processors 14 may be multi-core processors as described below with reference to FIG. 2. The processors 14 may each be configured for specific purposes that may be the same as or different from other processors 14 of the computing device 10. One or more of the processors 14 and processor cores of the same or different configurations may be grouped together.

The memory 16 of the SoC 12 may be a volatile or non-volatile memory configured for storing data and processor-executable code for access by the processor 14. The computing device 10 and/or SoC 12 may include one or more memories 16 configured for various purposes. In an aspect, one or more memories 16 may include volatile memories such as random access memory (RAM) or main memory, or cache memory. These memories 16 may be configured to temporarily hold a limited amount of data and/or processor-executable code instructions that is requested from non-volatile memory, loaded to the memories 16 from non-volatile memory in anticipation of future access based on a variety of factors, and/or intermediary processing data and/or processor-executable code instructions produced by the processor 14 and temporarily stored for future quick access without being stored in non-volatile memory. In an aspect, the memories 16 may be dedicated for use by or may be shared between different processors 14 or processor cores.

In an aspect, the memory 16 may be configured to store processor-executable code, at least temporarily, that is loaded to the memory 16 from another memory device, such as another memory 16 or storage memory 24, for access by one or more of the processors 14. In an aspect, the processor-executable code loaded to the memory 16 may be loaded in response to execution of a function by the processor 14. Loading the processor-executable code to the memory 16 in response to execution of a function may result from a memory access request to the memory 16 that is unsuccessful, or a miss, because the requested processor-executable code is not located in the memory 16. In response to a miss, a memory access request to another memory device may be made to load the requested processor-executable code from the other memory device to the memory device 16. In an aspect, loading the processor-executable code to the memory 16 in response to execution of a function may result from a memory access request to another memory device, and the processor-executable code may be loaded to the memory 16 for later access.

The communication interface 18, communication component 22, antenna 26, and/or network interface 28, may work in unison to enable the computing device 10 to communicate over a wireless network 30 via a wireless connection 32, and/or a wired network 44 with the remote computing device 50. The wireless network 30 may be implemented using a variety of wireless communication technologies, including, for example, radio frequency spectrum used for wireless communications, to provide the computing device 10 with a connection to the Internet 40 by which it may exchange data with the remote computing device 50.

The storage memory interface 20 and the storage memory 24 may work in unison to allow the computing device 10 to store data and processor-executable code on a non-volatile storage medium. The storage memory 24 may be configured much like an aspect of the memory 16 in which the storage memory 24 may store the processor-executable code for access by one or more of the processors 14. The storage memory 24, being non-volatile, may retain the information even after the power of the computing device 10 has been shut off. When the power is turned back on and the computing device 10 reboots, the information stored on the storage memory 24 may be available to the computing device 10. The storage memory interface 20 may control access to the storage memory 24 and allow the processor 14 to read data from and write data to the storage memory 24.

Some or all of the components of the computing device 10 may be differently arranged and/or combined while still serving the necessary functions. Moreover, the computing device 10 may not be limited to one of each of the components, and multiple instances of each component may be included in various configurations of the computing device 10.

Figure 2:
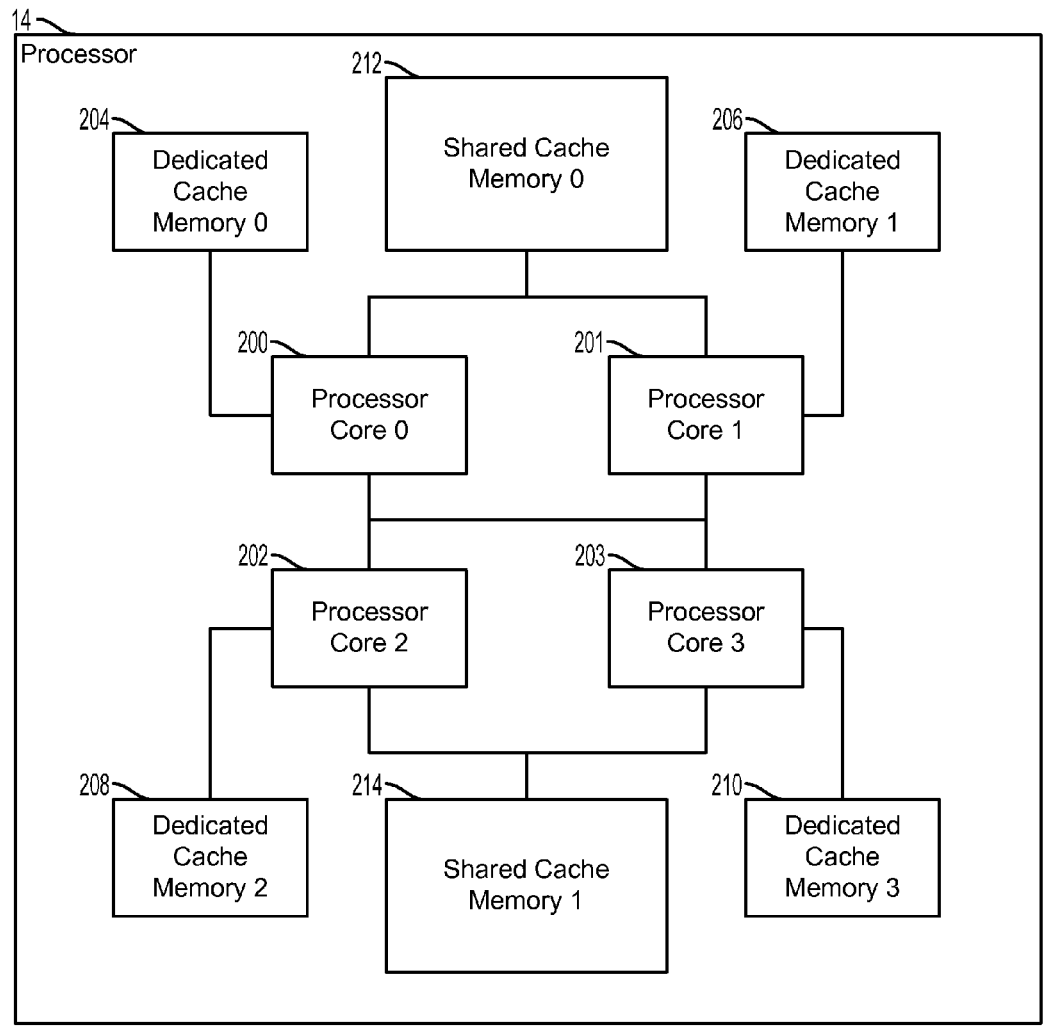
FIG. 2 is a component block diagram illustrating an example multi-core processor suitable for implementing an aspect.

FIG. 2 illustrates a multi-core processor 14 suitable for implementing an aspect. The multi-core processor 14 may have a plurality of homogeneous or heterogeneous processor cores 200, 201, 202, 203. The processor cores 200, 201, 202, 203 may be homogeneous in that, the processor cores 200, 201, 202, 203 of a single processor 14 may be configured for the same purpose and have the same or similar performance characteristics. For example, the processor 14 may be a general purpose processor, and the processor cores 200, 201, 202, 203 may be homogeneous general purpose processor cores. Alternatively, the processor 14 may be a graphics processing unit or a digital signal processor, and the processor cores 200, 201, 202, 203 may be homogeneous graphics processor cores or digital signal processor cores, respectively. For ease of reference, the terms "processor" and "processor core" may be used interchangeably herein.

The processor cores 200, 201, 202, 203 may be heterogeneous in that, the processor cores 200, 201, 202, 203 of a single processor 14 may be configured for different purposes and/or have different performance characteristics. Example of such heterogeneous processor cores may include what are known as "big.LITTLE" architectures in which slower, low-power processor cores may be coupled with more powerful and power-hungry processor cores.

In the example illustrated in FIG. 2, the multi-core processor 14 includes four processor cores 200, 201, 202, 203 (i.e., processor core 0, processor core 1, processor core 2, and processor core 3). For ease of explanation, the examples herein may refer to the four processor cores 200, 201, 202, 203 illustrated in FIG. 2. However, the four processor cores 200, 201, 202, 203 illustrated in FIG. 2 and described herein are merely provided as an example and in no way are meant to limit the various aspects to a four-core processor system. The computing device 10, the SoC 12, or the multi-core processor 14 may individually or in combination include fewer or more than the four processor cores 200, 201, 202, 203 illustrated and described herein.

In an aspect, the processor cores 200, 201, 202, 203 may have associated dedicated cache memories 204, 206, 208, 210. Like the memory 16 in FIG. 1, dedicated cache memories 204, 206, 208, 210 may be configured to temporarily hold a limited amount of data and/or processor-executable code instructions that is requested from non-volatile memory or loaded from non-volatile memory in anticipation of future access. The dedicated cache memories 204, 206, 208, 210 may also be configured to store intermediary processing data and/or processor-executable code instructions produced by the processor cores 200, 201, 202, 203 and temporarily stored for future quick access without being stored in non-volatile memory. The dedicated cache memories 204, 206, 208, 210 may each be associated with one of the processor cores 200, 201, 202, 203. Each dedicated cache memory 204, 206, 208, 210 may be accessed by its respective associated processor core 200, 201, 202, 203. In the example illustrated in FIG. 2, each processor core 200, 201, 202, 203 is in communication with one of the dedicated cache memories 204, 206, 208, 210 (i.e., processor core 0 is paired with dedicated cache memory 0, processor core 1 with dedicated cache memory 1, processor core 2 with dedicated cache memory 2, and processor core 3 with dedicated cache memory 3). Each processor core 200, 201, 202, 203 is shown to be in communication with only one dedicated cache memory 204, 206, 208, 210, however the number of dedicated cache memories is not meant to be limiting and may vary for each processor core 200, 201, 202, 203.

In an aspect, the processor cores 200, 201, 202, 203 may have associated shared cache memories 212, 214. The shared cache memories 212, 214 may be configured to perform similar functions to the dedicated cache memory 204, 206, 208, 210. However, the shared cache memories 212, 214 may each be in communication with more than one of the processor cores 200, 201, 202, 203 (i.e., processor core 0 and processor core 1 are paired with shared cache memory 0, and processor core 2 and processor core 3 are paired with shared cache memory 1). Each processor core 200, 201, 202, 203 is shown to be in communication with only one shared cache memory 212, 214, however the number of shared cache memories is not meant to be limiting and may vary for each processor core 200, 201, 202, 203. Similarly, each shared cache memory is shown to be in communication with only two processor cores 200, 201, 202, 203, however the number of processor cores is not meant to be limiting and may vary for each shared cache memory 212, 214. The processor cores 200, 201, 202, 203 in communication with the same shared cache memory 212, 214, may be grouped together in a processor cluster as described further herein.

Figure 3:
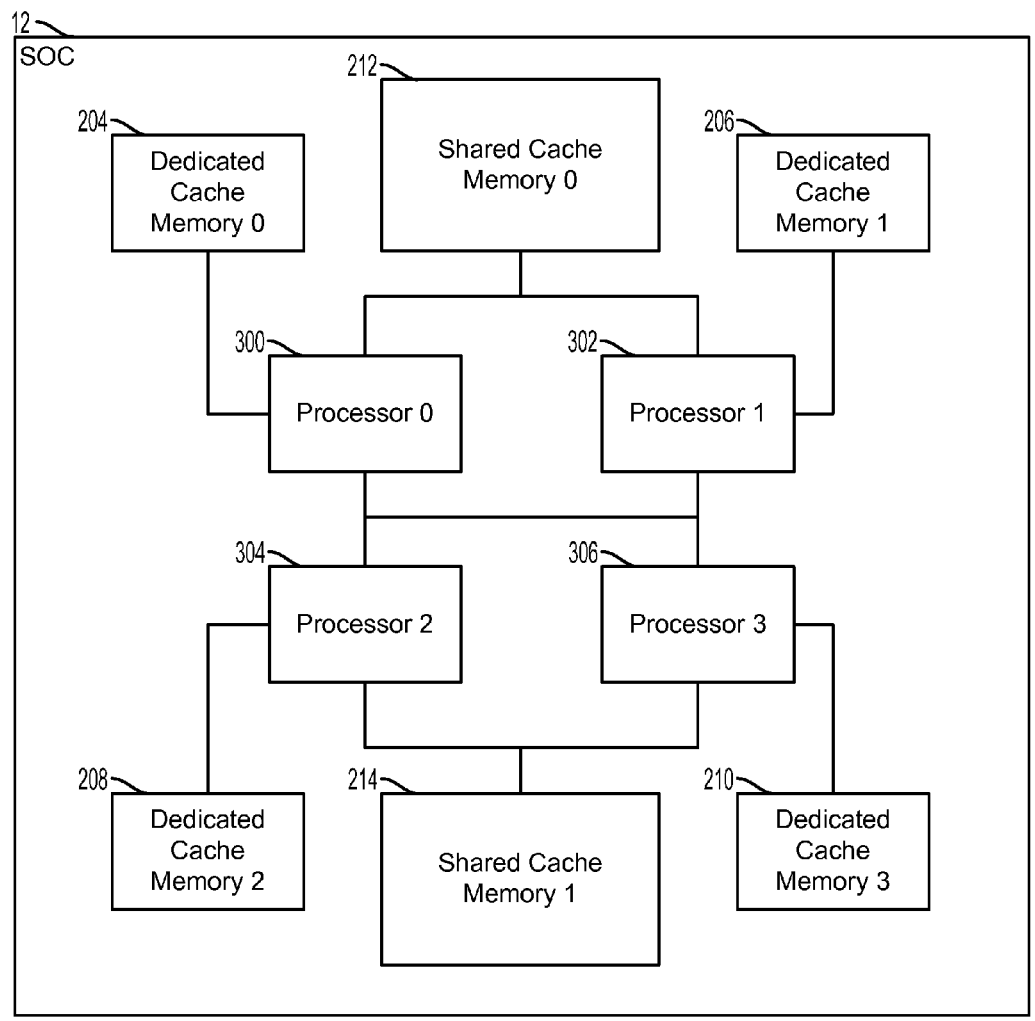
FIG. 3 is a component block diagram illustrating an example system on chip (SoC) suitable for implementing an aspect.

FIG. 3 illustrates an SoC 12 suitable for implementing an aspect. The SoC 12 may have a plurality of homogeneous or heterogeneous processors 300, 302, 304, 306. Each of the processors 300, 302, 304, 306 may be similar to the processor 14 in FIG. 2. The purposes and/or performance characteristics of each processor 300, 302, 304, 306 may determine whether the processors 300, 302, 304, 306 are homogeneous or heterogeneous in a similar manner as the processor cores 200, 201, 202, 203 in FIG. 2.

The dedicated cache memories 204, 206, 208, 210 and shared cache memories 212, 214 are also similar to the same components described in FIG. 2, however here the dedicated cache memories 204, 206, 208, 210 and shared cache memories 212, 214 are in communication with the processors 300, 302, 304, 306. The number and configuration of the components of the SoC 14 is not meant to be limiting, and the SoC 14 may include more or fewer of any of the components in varying arrangements.

In an aspect, the processors and processor cores described herein need not be located on the same SoC or processor to share a shared cache memory. The processors and processor cores may be distributed across various components while maintaining a connection to the same shared cache memory as one or more other processors or processor cores.

Figure 4:
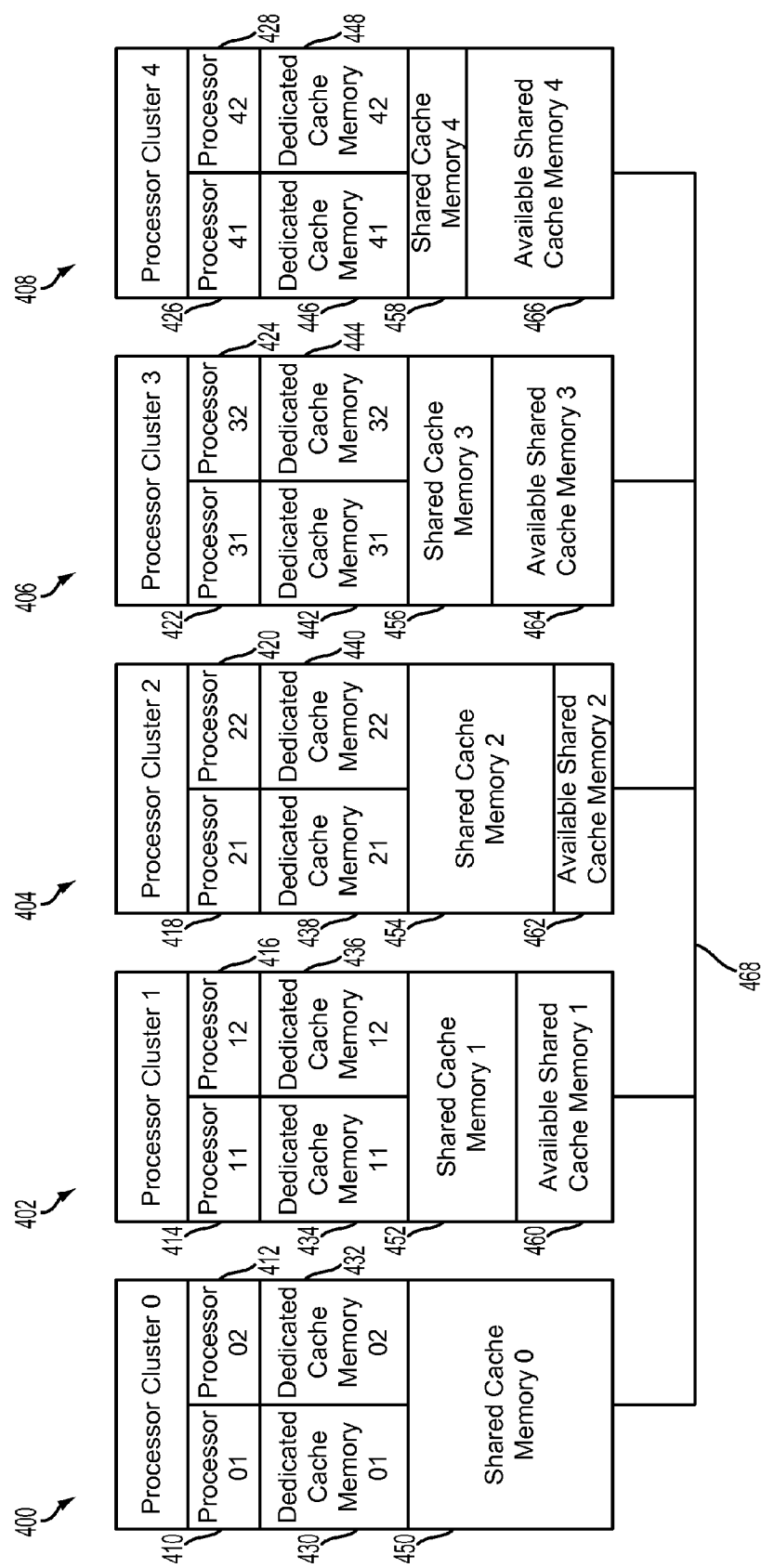
FIG. 4 is an illustration of multiple processor clusters including levels of available shared cache memory for each processor cluster in accordance with an aspect.

FIG. 4 illustrates multiple processor clusters 400, 402, 404, 406, 408 including varying levels of available shared cache memory 460, 462, 464, 466 in accordance with an aspect. The processor clusters 400, 402, 404, 406, 408 in the example shown in FIG. 4 (and later described in FIGS. 7 and 9) are each shown to have two processors 410, 412, 414, 416, 418, 420, 422, 424, 426, 428, each associated with a dedicated cache memory 430, 432, 434, 436, 438, 440, 442, 444, 446, 448, and shared cache memory 450, 452, 454, 456, 458. For example, processor cluster 400 (processor cluster 0), includes processors 410 (processor 01), 412 (processor 02), and the processors 410, 412 are each associated with a respective dedicated cache memory 430 (dedicated cache memory 01 associated with processor 01), 432 (dedicated cache memory 02 associated with processor 02). Moreover, the processors 410, 412 are each associated with a shared cache memory 450 (shared cache memory 0 associated with processor 01 and processor 02). The processor clusters 400, 402, 404, 406, 408 may be in communication with each other via an interconnect bus 468, which may allow the processor clusters 400, 402, 404, 406, 408 to communicate data to, from, and relating to the shared cache memories 450, 452, 454, 456, 458. As noted above, these example processor clusters 400, 402, 404, 406, 408 are not meant to be limiting and may be provided with components in a variety of numbers and configurations.

One or more of the shared cache memories 450, 452, 454, 456, 458 may include a portion which is available shared cache memory 460, 462, 464, 466. In other words, portions of the shared cache memories 450, 452, 454, 456, 458 may be in use, either storing information for potential use or being accessed. Other portions of the shared cache memories 450, 452, 454, 456, 458 may be idle or available, either storing information no longer designated for use, empty, or not being accessed. The available shared cache memory 460, 462, 464, 466 is the latter portion of the shared cache memories 450, 452, 454, 456, 458. Each available shared cache memory 460, 462, 464, 466 may include varying levels of shared cache memory space as indicated by the varying sizes of the available shared cache memory 460,

462, 464, 466. The amount of shared cache memory space of each available shared cache memory 460, 462, 464, 466 may vary over time depending on the use of the shared cache memories 450, 452, 454, 456, 458.

The example illustrated in FIG. 4 shows that the processor cluster 400 does not have an available shared cache memory. In this example, the processor cluster 400 is assigned a process with high shared cache memory demand (which may also be called an execution process), meaning that the execution process uses all or nearly all of what may have been available shared cache memory for shared cache memory 450. Any of the processor clusters 400, 402, 404, 406, 408 may also be called an execution processor cluster 400, 402, 404, 406, 408 when assigned the execution process. Any of the shared cache memories 450, 452, 454, 456, 458 may also be called remote shared cache memories 450, 452, 454, 456, 458 when they are remote to the execution processor cluster 400, 402, 404, 406, 408. Further, the example shows that each of the shared cache memories 452, 454, 456, 458 includes a different level of available shared cache memory 460, 462, 464, 466 (i.e. available shared cache memory 2 is smaller than available shared cache memory 1, which is smaller than available shared cache memory 3, which is smaller than available shared cache memory 4). The location of each of the processor clusters 402, 404, 406, 408 in relation to the execution process cluster 400 may indicate a relative distance of each of the processor clusters 402, 404, 406, 408 from the execution process cluster 400. The relative distance may result in varying latencies for communications between the processor clusters 402, 404, 406, 408 and the execution process cluster 400.

Figure 5:
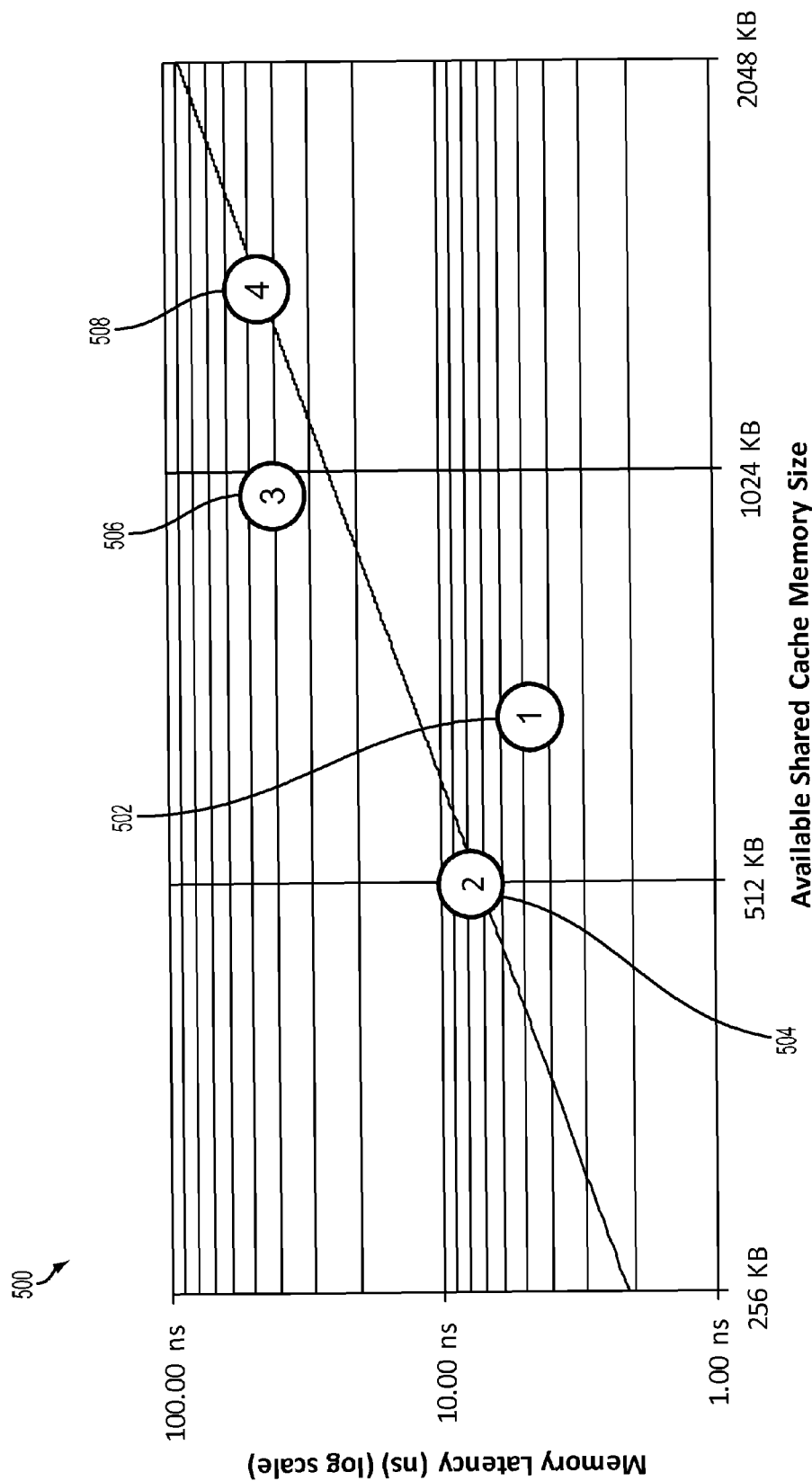
FIG. 5 is a graph illustration including plot points for multiple processor clusters in relation to an execution processor cluster in accordance with an aspect.

FIG. 5 illustrates a graph 500 of memory latency versus available shared memory cache size, including plot points 502, 504, 506, 508 for the processor clusters 402, 404, 406, 408 in relation to an execution processor cluster 400. Each plot points 502, 504, 506, 508 correlates with one of the processor clusters 402, 404, 406, 408 in FIG. 4 (i.e. plot point 1 correlates with processor cluster 1, plot point 2 with processor cluster 2, plot point 3 with processor cluster 3, and plot point 4 with processor cluster 4). The graph 500 correlates with the available shared memory cache size and distances/latencies expressed in FIG. 4. For example, the processor clusters 402 is closest in distance to execution processor cluster 400, so plot point 502 is lowest on the y-axis depicting memory latency. The further the processor clusters 404, 406, 408 are from the execution processor cluster 400, the more memory latency is shown by the corresponding plot points 504, 506, 508. Similarly, the size of the available shared cache memory 460, 462, 464, 466 for the corresponding processor cluster 402, 404, 406, 408 is shown by the corresponding plot point 502, 504, 506, 508 along the x-axis. The values shown on the axes of graph 500 are meant to be exemplary and non-limiting, and any range of values may be used in measuring the memory latency and available shared cache memory size.

In the example illustrated in FIG. 5 and corresponding with the example illustrated in FIG. 4, the processor cluster 402 has the lowest memory latency when communicating with the execution processor cluster 400 and the second lowest amount of available shared cache memory 450 as depicted by the plot point 502. Similarly, the processor cluster 404 has the second lowest memory latency and the lowest available shared cache memory 452 as depicted by the plot point 504. The processor cluster 406 has the second highest memory latency and the second highest available shared cache memory 454 as depicted by the plot point 506. The processor cluster 408 has the highest memory latency and the highest available shared cache memory 456 as depicted by the plot point 508. In general, a preferred available shared cache memory for use as victim cache for the execution process would have a combination of the lowest memory latency and the highest available shared cache memory size (i.e. closest to the bottom right corner of graph 500). However, the lowest memory latency and the highest available shared cache memory size may not always be available from the available shared cache memory 460, 462, 464, 466. Therefore, various methods may be employed to select the available shared cache memory 460, 462, 464, 466 as a victim cache for the execution process executed by the execution process cluster 500.

Figure 6:
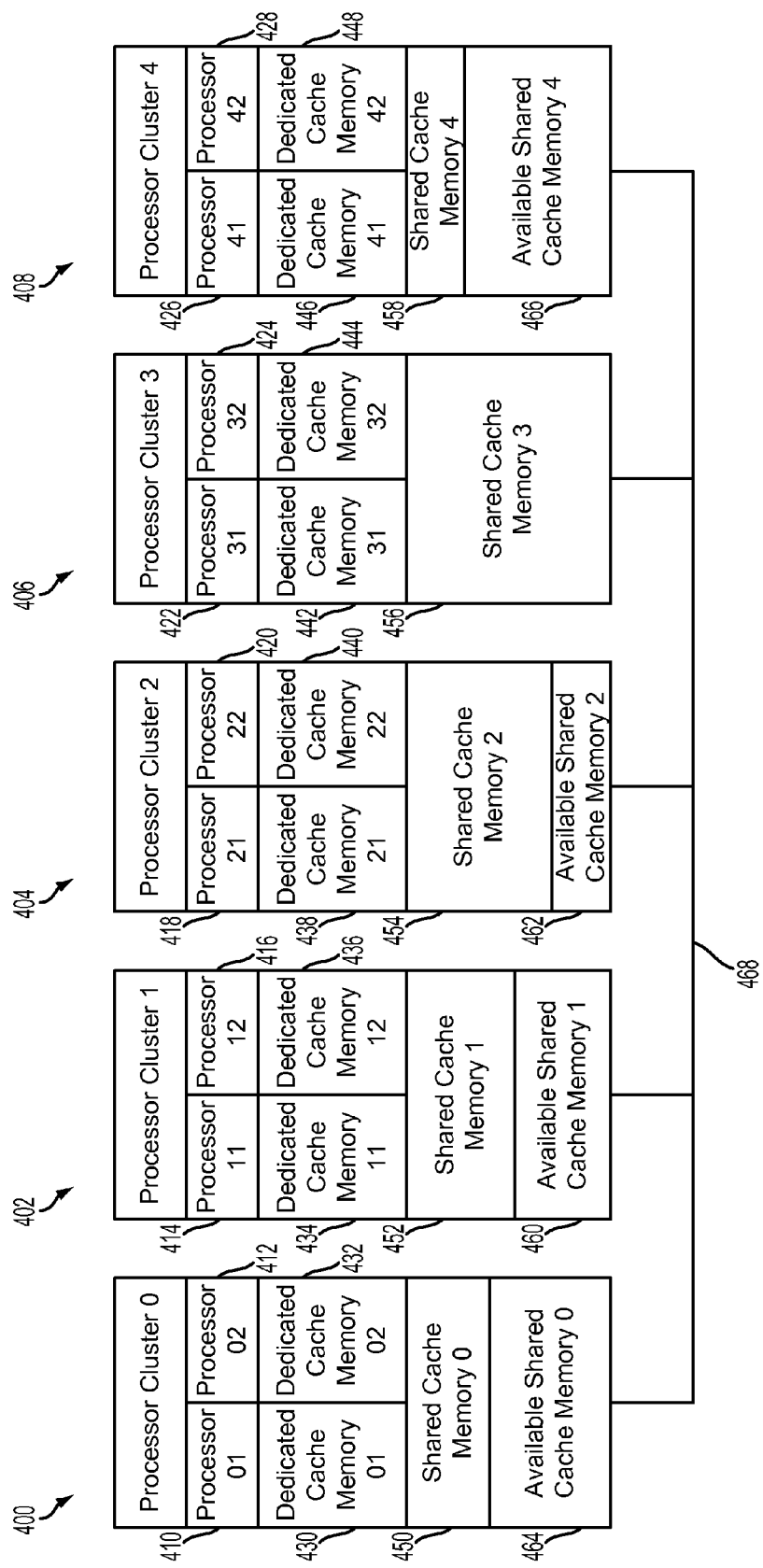
FIG. 6 is an illustration of multiple processor clusters including levels of available shared cache memory for each processor cluster in accordance with an aspect.

FIG. 6 illustrates multiple processor clusters 400, 402, 404, 406, 408 including varying levels of available shared cache memory 460, 462, 464, 466, as in FIG. 4, in accordance with an aspect. In an aspect, the execution process may be rescheduled from the processor clusters 400, 402, 404, 406, 408 to reduce the latency between the execution processor cluster and the processor cluster containing the available shared cache memory to be used as a victim cache. FIG. 6 is similar to but varies from FIG. 4. Where as in FIG. 4 the execution processor cluster is the processor cluster 400, in FIG. 6 the execution process is rescheduled to processor cluster 406 such that in this example it is the execution processor cluster 406. Further, the process that was scheduled for the processor cluster 406 in FIG. 4 in this example is rescheduled to the processor cluster 400, such that the processor cluster 400 now includes the available shared cache memory 464, which may be equivalent to the available shared cache memory 464 of FIG. 4. In this example, the execution processor cluster 406 no longer includes the available shared cache memory 464.

As described further herein, the execution process may be rescheduled from one execution processor cluster 400, in FIG. 4, to a new execution processor cluster 406. This may be done to reduce latency in executing the execution process as the execution processor cluster 406 may be in closer proximity to the shared cache memory 460, 462, 464, 466 making up the victim cache. In this example, the victim cache may include the available shared cache memory 466 of the shared cache memory 458 in processor cluster 408. The shared cache memory 458 may be selected for use as the victim cache in accordance with any of the aspects for selecting shared cache memories as part of the victim cache described herein. In an aspect, shared cache memory 458 may be selected based on that it contains the most available shared cache memory 466. The processor cluster 406 may be selected as the execution processor cluster 406 because the latency, for example based on proximity, is lowest between processor cluster 408, containing available shared cache memory 466, and processor cluster 406.

Figure 7:
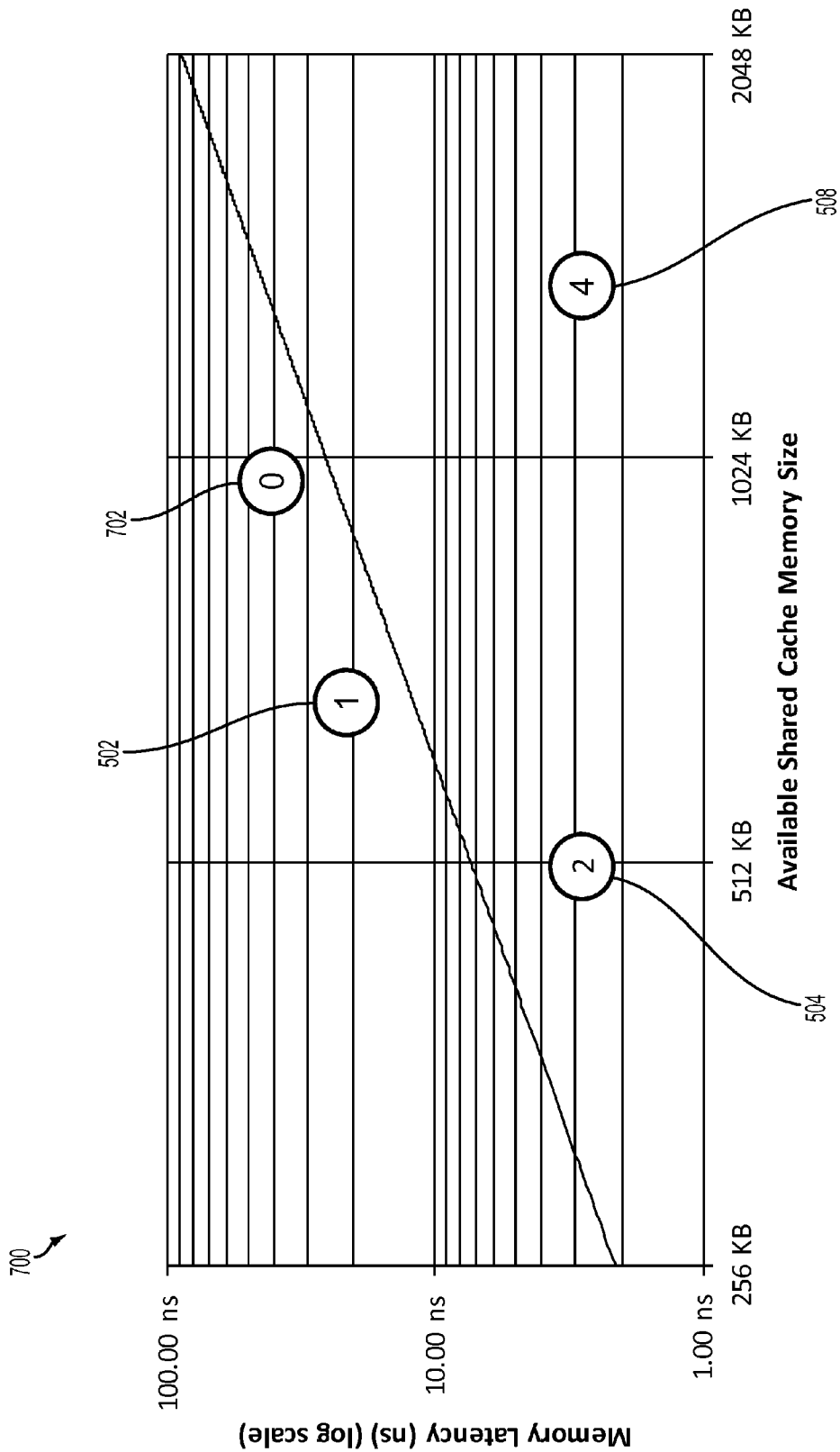
FIG. 7 is a graph illustration including plot points for multiple processor clusters in relation to an execution processor cluster in accordance with an aspect.

FIG. 7 illustrates a graph 700 of memory latency versus available shared memory cache size, including plot points 502, 504, 508, 1402 for the processor clusters 400, 402, 404, 408 in relation to an execution processor cluster 406. Each plot points 502, 504, 508, 702 correlates with one of the processor clusters 400, 402, 404, 408 in FIG. 6 (i.e. plot point 0 correlates with processor cluster 0, plot point 1 with processor cluster 1, plot point 2 with processor cluster 2, and plot point 4 with processor cluster 4). The graph 1400 correlates with the available shared memory cache size and distances/latencies expressed in FIG. 6. FIG. 7 is also a variation of FIG. 5, which shows plot point 508 before the execution process is rescheduled indicating that processor cluster 408 contains the most available shared cache memory 466. As discussed above in relation to FIG. 6, because processor cluster 408 contains the most available shared cache memory 466, the execution process is rescheduled from processor cluster 402 to processor cluster 406. The execution process is rescheduled to take advantage of the largest amount of available shared cache memory 466 and to reduce the latency in using the available shared cache memory 466 as a victim cache. As a result of rescheduling the execution process to now execution processor cluster 406, the graph 700 illustrates a change in the latencies of the processor clusters 402, 404, 408 from FIG. 5, and includes processor cluster 400 in place of execution processor cluster 406. The graph 700 now illustrates with plot point 508 that while processor cluster 408 still has the highest available shared cache memory 466, it now also has the lowest latency in relation to execution processor cluster 406.

Figure 8:
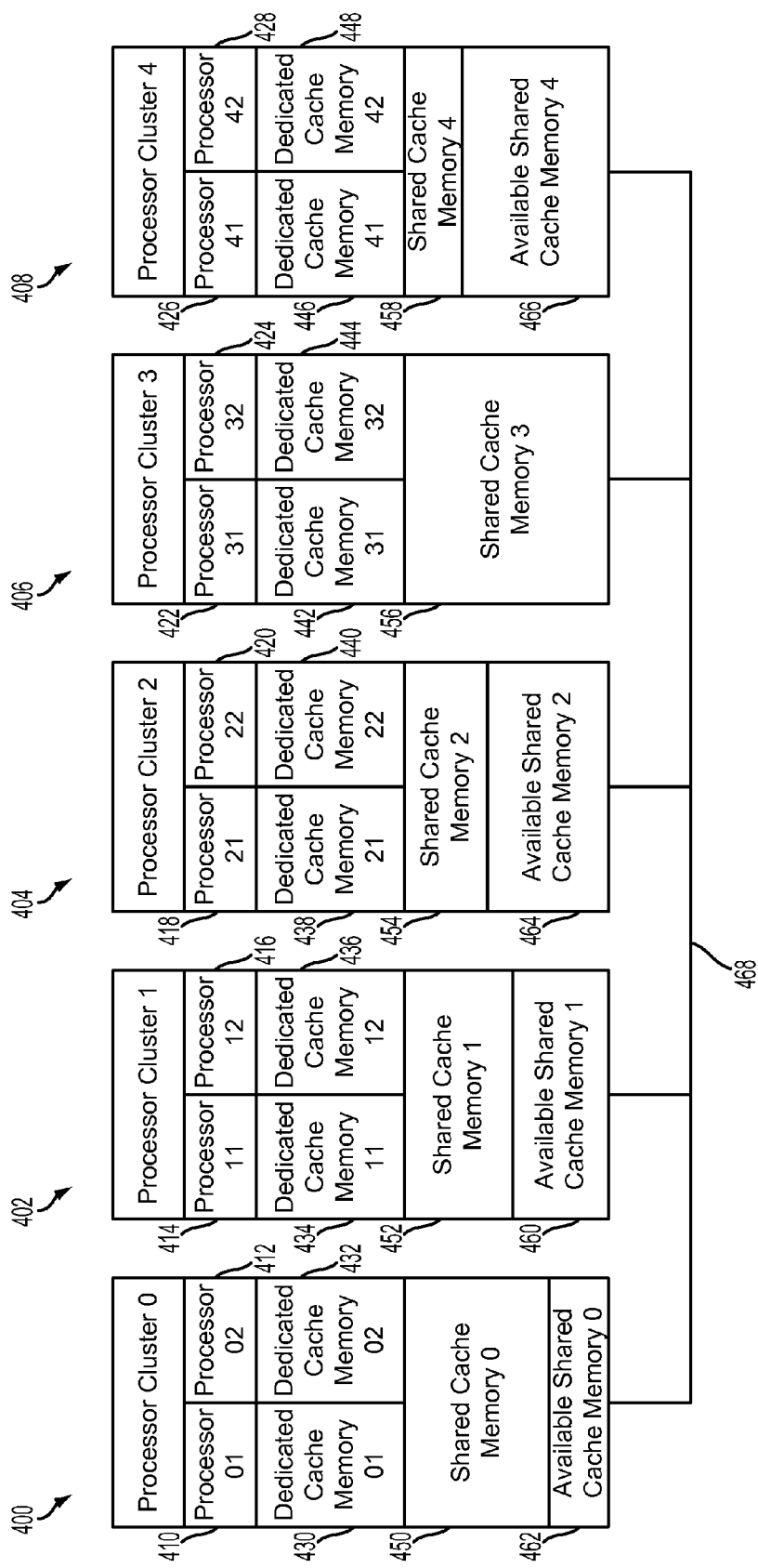
FIG. 8 is an illustration of multiple processor clusters including levels of available shared cache memory for each processor cluster in accordance with an aspect.

FIG. 8 illustrates multiple processor clusters 400, 402, 404, 406, 408 including varying levels of available shared cache memory 460, 462, 464, 466, as in FIGS. 4 and 6, in accordance with an aspect. In an aspect, a process other than the execution process may be rescheduled from processor clusters 400, 402, 404, 406, 408 to reduce the latency between the execution processor cluster and the processor cluster containing the available shared cache memory to be used as a victim cache. Rather than or in addition to rescheduling the execution process, the example in FIG. 8 illustrates rescheduling another process closer to the execution process to increase the available shared cache memory for use as a victim cache with lower latency. In FIG. 6, the execution process is scheduled to the execution processor cluster 406 and available shared cache memory 466 is used as a victim cache, which carries over in FIG. 8. The highest available shared cache memory that isn't already part of the victim cache may be identified to be added to the victim cache. In the example in FIG. 6, the highest available shared cache memory that isn't already part of the victim cache is available shared cache memory 464 of processor cluster 400. To add the highest available shared cache memory 464 to the victim cache while reducing the latency in using available shared cache memory 464, the process of processor cluster 400 may be rescheduled to a processor cluster with lower latency for the execution processor cluster 406.

In the example in FIG. 6, the processor clusters 402 and 404 are closer in proximity to/have lower latency with the execution processor cluster 406 than the processor cluster 400. Since, the processor cluster 404 is even closer/has lower latency than the processor cluster 402, the process of the processor cluster 400 may be rescheduled for the processor cluster 404. In turn, any process already scheduled for the processor cluster 404 may be rescheduled to another processor cluster, such as processor cluster 400. In rescheduling the processes of the processor clusters 400 and 404, each may end up with the available cache memory space 462, 464 of their associated rescheduled processes. Thus, the larger available cache memory space 464 may be found on processor cluster 404, closer to the execution processor 406, after the processes are rescheduled. The available cache memory space 464 may now be used by the execution process as at least part of a victim cache with lower latency than when it was on processor cluster 400.

Figure 9:
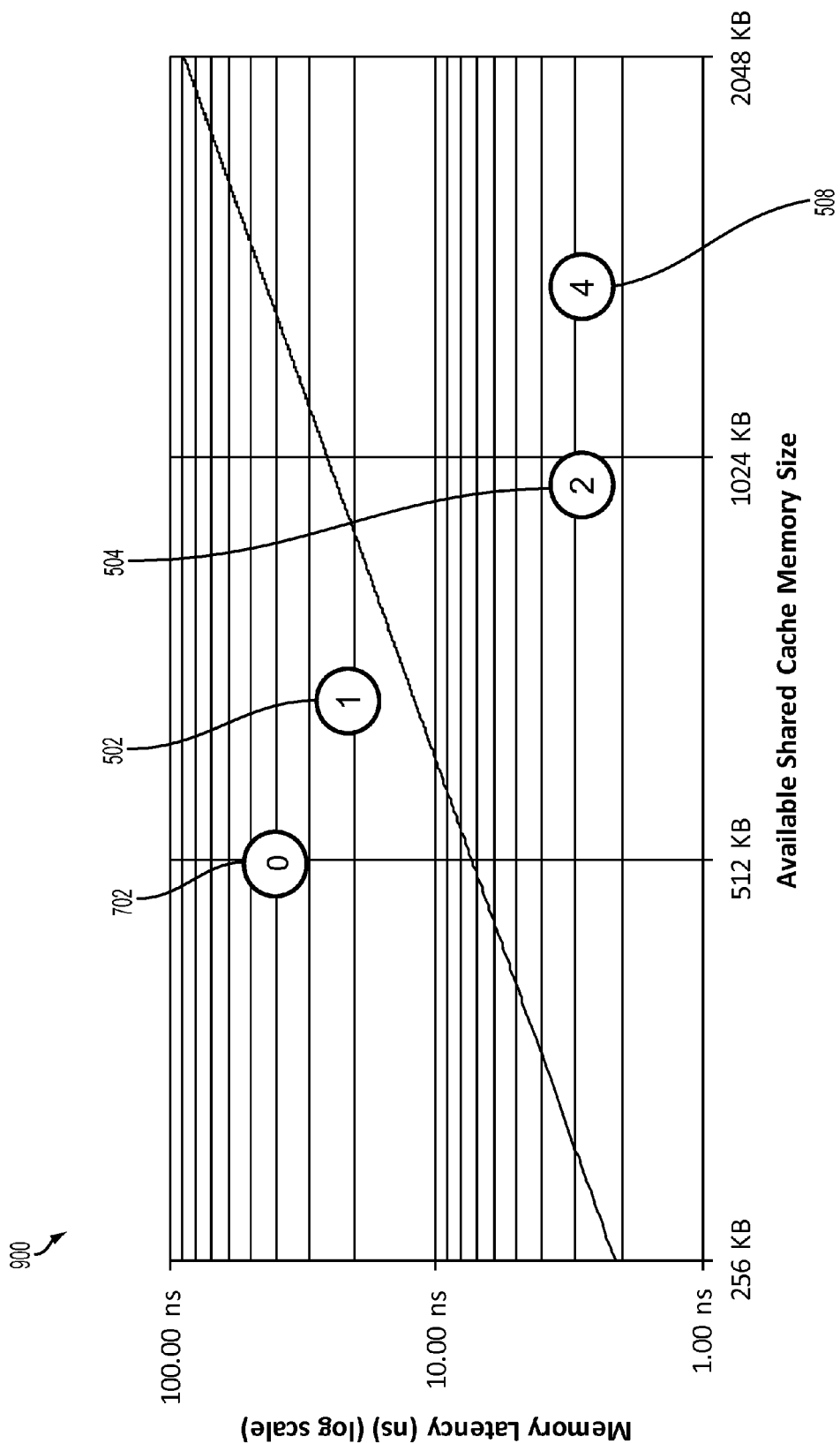
FIG. 9 is a graph illustration including plot points for multiple processor clusters in relation to an execution processor cluster in accordance with an aspect.

FIG. 9 illustrates a graph 900 of memory latency versus available shared memory cache size, including plot points 502, 504, 508, 702 for the processor clusters 400, 402, 404, 408 in relation to an execution processor cluster 406. Each plot points 502, 504, 508, 702 correlates with one of the processor clusters 400, 402, 404, 408 in FIG. 6 (i.e. plot point 0 correlates with processor cluster 0, plot point 1 with processor cluster 1, plot point 2 with processor cluster 2, and plot point 4 with processor cluster 4). The graph 900 correlates with the available shared memory cache size and distances/latencies expressed in FIG. 8. FIG. 9 is also a variation of FIG. 7, which shows plot points 504, 702 before the process associated with processor clusters 400 and 404 are rescheduled. As discussed above in relation to FIG. 8, because processor cluster 400 contains the most available shared cache memory 464 that is not already part of the victim cache, the process scheduled for processor cluster 400 is rescheduled to processor cluster 404. The process is rescheduled to processor cluster 404 to take advantage of the largest amount of available shared cache memory 464 and to reduce the latency in using the available shared cache memory 464 as a victim cache. As a result of rescheduling the process to processor cluster 404, the graph 900 illustrates a change in the amount of available shared cache memory space and in the latencies of the processor clusters 400, 404 from FIG. 6. The graph 900 now illustrates with plot point 504 that the processor cluster 404 now has the highest available shared cache memory 466 for adding to the victim cache and has lower latency in relation to execution processor cluster 406.

Figure 10:
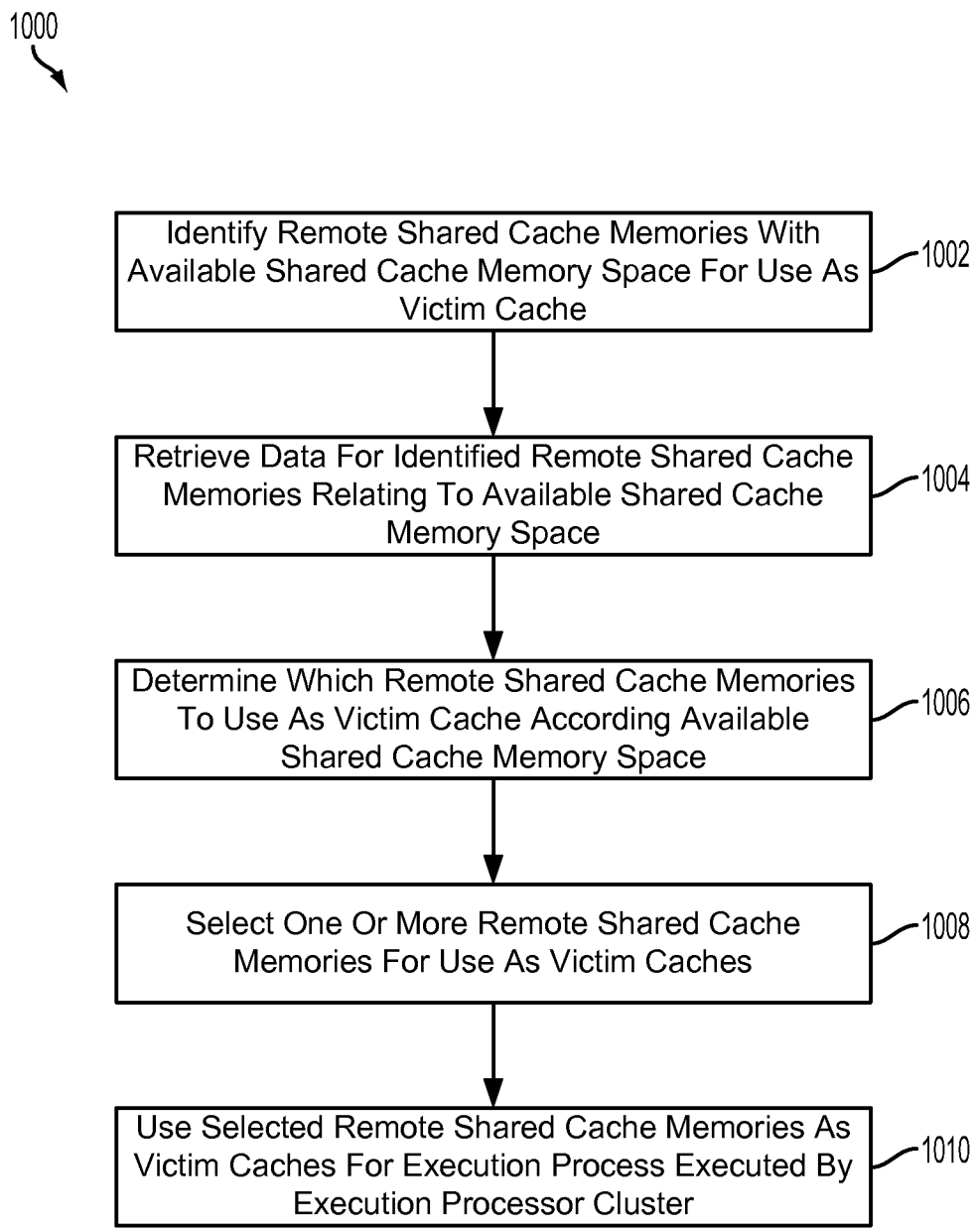
FIG. 10 is process flow diagram illustrating an aspect method for implementing a selection of available remote shared cache memories as victim caches.

FIG. 10 illustrates an aspect method 1000 for implementing a selection of remote available shared cache memories as victim caches. The method 1000 may be executed in a computing device using software, general purpose or dedicated hardware, such as a processor, or a combination of software and hardware. In block 1002 the computing device may identify a remote shared cache memory with available shared cache memory space for use as a victim cache. The identification of such remote shared cache memory may include the determination by the computing device of whether or how much available shared cache memory space is associated with a remote shared cache memory. This may be accomplished by the processor monitoring the hit and/or miss rate of a remote shared cache memory or by checking for available address spaces in a data structure, such as a table, configured to retain such information. Whether a remote shared cache memory is suitable for use as a victim cache may depend on whether the amount of its available shared cache memory space exceeds a threshold.

In block 1004 the computing device may retrieve data for the identified remote shared cache memories relating to the amount of available shared cache memory space of the remote shared cache memories. In block 1006 the computing device may determine which remote shared cache memories to use as the victim cache according to the amount of available shared cache memory space of the remote shared cache memories. This determination may be made on a comparison of the retrieved data of the identified remote shared cache. In an aspect, comparison of the retrieved data may include comparison of the retrieved data of one remote shared cache memory against the retrieved data of another or to a threshold to select or reject the remote shared cache memory as a victim cache. In an aspect, comparison of the retrieved data may include comparison of the retrieved data of one remote shared cache memory may include calculations using the retrieved data to determine a value for the comparison.

In block 1008 the computing device may select one or more of the remote shared cache memories for use as the victim cache. The selection of a remote shared cache memory for use as a victim cache may result from a favorable outcome of the comparison in block 1006. In block 1010 the computing device may use the selected remote shared cache memories as the victim cache for the execution process executed by the execution processor cluster.

Figure 11:
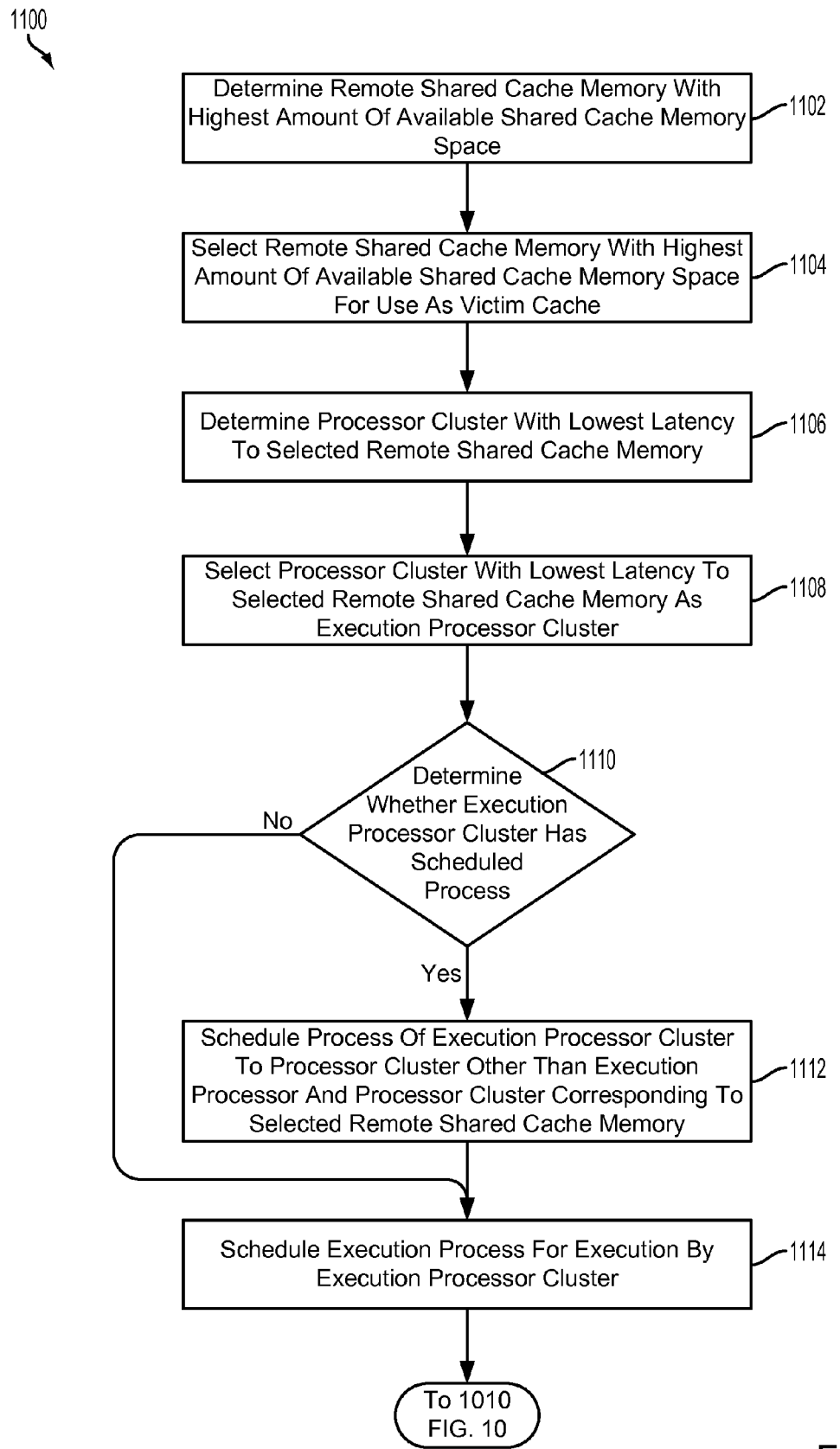
FIG. 11 is process flow diagram illustrating an aspect method for implementing scheduling an execution process to an execution process cluster to take advantage of reduced latency with a victim cache.

FIG. 11 illustrates an aspect method 1100 for implementing scheduling an execution process to an execution process cluster to take advantage of reduced latency with a victim cache. The method 1100 may be executed in a computing device using software, general purpose or dedicated hardware, such as a processor, or a combination of software and hardware. In an aspect, the method 1100 may be implemented along with the blocks 1002, 1004, 1006, 1008 for selecting the remote shared cache memory to use in the victim cache, which may affect the selection of a processor cluster to schedule the execution process. In an aspect, the execution process may include high cache memory demands. The method 1100 may be implemented with block 1102 where the computing device may determine a remote shared cache memory with a highest amount of available share cache memory space. As noted herein, the remote shared cache memories, from which the computing device may make the determination of the greatest amount of available shared cache memory, includes remote shared cache memories not already part of the victim cache.

The remote shared cache memory may be remote to a processor cluster scheduled to execute the execution process, and the remote shared cache memory may have available shared cache memory due to low cache memory requirements of a process scheduled to a related processor cluster. The remote shared cache with the highest amount of available shared cache memory space may be associated with a processor cluster scheduled to execute a process with the lowest cache memory requirements of any process scheduled to any other processor cluster.

The determination of the remote shared cache memory that includes the most available shared cache memory space may include determining whether or how much available shared cache memory space is associated with a remote shared cache memory. This may be accomplished by monitoring the hit and/or miss rate of a remote shared cache memory or by checking for available address spaces in a data structure, such as a table, configured to retain such information. Whether a remote shared cache memory is suitable for use as a victim cache may depend on whether the amount of its available shared cache memory space exceeds a threshold. In block 1104 the computing device may select the remote shared cache memory with the highest amount of available shared cache memory space for use as a victim cache.

In block 1106 the computing device may determine the processor cluster with the lowest latency with respect to the selected remote shared cache memory, or the with respect to the processor cluster containing the selected remote shared cache memory. In an aspect, the latency between processor clusters may be measured over a time period, calculated based on historical information, and/or retrieved from storage. The latency between processor clusters retrieved from storage may be provided during a design and construction phase of the components, or stored previously measured latency data. The determination of the processor cluster with the lowest latency with respect to the selected remote shared cache memory may be made based on a favorable result of a comparison of the latencies between the processor clusters and the processor cluster containing the selected remote shared cache memory. In block 1108 the computing device may select the processor cluster with the lowest latency to selected remote shared cache memory as execution processor cluster.

In determination block 1110 the computing device may determine whether the execution processor cluster has a scheduled process. In response to determining that the execution processor cluster does have a scheduled process (i.e. determination block 1110="Yes"), the computing device may schedule the current process of the execution processor cluster to a processor cluster other than execution processor cluster and the processor cluster corresponding to the selected remote shared cache memory in block 1112. To schedule the execution process to the execution processor cluster, the computing device may prefer to reschedule any existing process scheduled for the execution processor cluster to free up the execution processor cluster for the execution process. This rescheduling may not be necessary, particularly if the existing process is close to completion, however it may avoid delay in executing the execution process. Therefore, the computing device may reschedule the existing process to another processor cluster that is not the execution processor cluster. Further, the computing device may reschedule the existing process to another processor cluster that is not the processor cluster which contains the selected remote shared cache memory. The existing process scheduled on the execution processor cluster may already be determined to not allow for the highest amount of available shared cache memory as another processor cluster may already be determined to contain the highest amount of available shared cache memory. Rescheduling the existing process to the processor cluster containing the highest amount of available shared cache memory may reduce the available shared cache memory space of the processor cluster, such that it no longer has the highest available shared cache memory space. Therefore, it may be preferable to avoid rescheduling the existing process of the execution processor cluster to the processor cluster containing the highest amount of available shared cache memory. The existing process may be rescheduled to any other processor cluster.

In block 1114 the computing device may schedule the execution process for execution by the execution processor cluster. As a result of this scheduling of the execution process, the execution process may now be executed by the execution processor cluster using a victim cache which includes the highest available shared cache memory space on a processor cluster with the lowest latency to the execution processor cluster. The computing device may use the selected remote shared cache memories as the victim cache for the execution process executed by the execution processor cluster in block 1010.

In response to determining that the execution processor cluster does not have a scheduled process (i.e. determination block 1110="No"), the computing device may schedule the execution process for execution by the execution processor cluster in block 1114.

Figure 12:
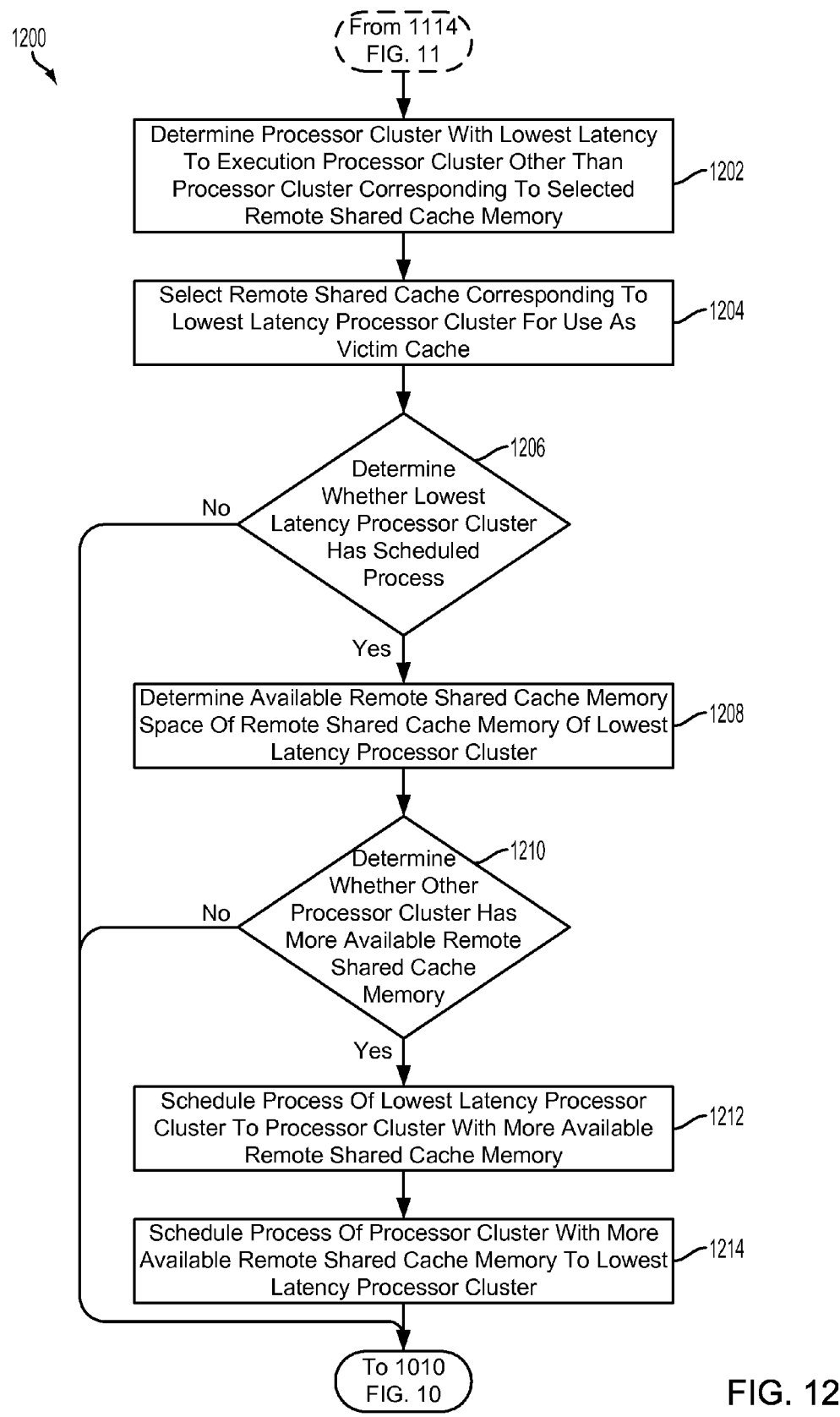
FIG. 12 is process flow diagram illustrating an aspect method for implementing scheduling a lower demand process to a processor cluster for the execution process to take advantage of reduced latency and higher availability of a victim cache.

FIG. 12 is process flow diagram illustrating an aspect method for implementing scheduling a lower demand process to a processor cluster for the execution process to take advantage of reduced latency and higher availability of a victim cache. The method 1200 may be executed in a computing device using software, general purpose or dedicated hardware, such as a processor, or a combination of software and hardware. In an aspect, the method 1200 may optionally be implemented along with the method 1100 for scheduling an execution process to an execution process cluster to take advantage of reduced latency with a victim cache, continuing from block 1114. In an aspect, the method 1200 may be implemented as a standalone method. In block 1202 the computing device may determine the processor cluster with the lowest latency to the execution processor cluster other than any processor cluster corresponding to a selected remote shared cache memory. In an aspect, the latency between processor clusters may be measured over a time period, calculated based on historical information, and/or retrieved from storage. The latency between processor clusters retrieved from storage may be provided during a design and construction phase of the components, or stored previously measured latency data. The determination of the processor cluster with the lowest latency with respect to the execution processor cluster may be made based on a favorable result of a comparison of the latencies between the processor clusters and the execution processor cluster containing the selected remote shared cache memory. In an aspect, the method 1200 may serve to expand a victim cache by adding available shared cache memory from processor clusters to a victim cache. Therefore, in aspects where a selected remote shared cache memory of a processor cluster already belongs to the victim cache, it may be preferable to not select such a processor cluster to avoid replacing its selected remote shared cache memory in the victim cache. In block 1204 the computing device may select the remote shared cache corresponding to the lowest latency processor cluster for use in the victim cache.

In determination block 1206 the computing device may determine whether the lowest latency processor cluster has an existing scheduled process. In response to determining that the lowest latency processor cluster does have an existing scheduled process (i.e. determination block 1206="Yes"), the computing device may determine the available remote shared cache memory space of the corresponding lowest latency processor cluster in block 1208. This may be accomplished by monitoring the hit and/or miss rate of the remote shared cache memory or by checking for available address spaces in a data structure, such as a table, configured to retain such information. In determination block 1210 the computing device may determine whether another processor cluster has more available remote shared cache memory than the lowest latency processor cluster. In an aspect, this determination may exclude the execution processor cluster and potentially any processor cluster corresponding with available shared cache memory already included in the victim cache. As discussed herein, the size of available shared cache memory for any processor cluster may be determined by monitoring the hit and/or miss rate of the remote shared cache memory, or by checking for available address spaces in a data structure, such as a table, configured to retain such information. The determination of a greater amount of available remote shared cache memory may be based on a favorable result of a comparison of the available remote shared cache memory of the processor clusters.

In response to determining that another processor cluster does have more available remote shared cache memory than the lowest latency processor cluster (i.e. determination block 1210="Yes"), the computing device may schedule the process of lowest latency processor cluster to the processor cluster with the more available remote shared cache memory in block 1212. In block 1214 the computing device may schedule the process of the processor cluster with the more available remote shared cache memory to the lowest latency processor cluster. In scheduling the processes of the lowest latency processor cluster and the processor cluster with the more available remote shared cache memory to each other, the lowest latency processor cluster becomes the processor cluster with the more available remote shared cache memory. As such, the greatest available remote shared cache memory now corresponds with the lowest latency processor cluster. The computing device may use the selected remote shared cache memory as the victim cache for the execution process executed by the execution processor cluster in block 1010.

In response to determining that the lowest latency processor cluster does not have an existing scheduled process (i.e. determination block 1206="No"), the computing device may use the selected remote shared cache memory as the victim cache for the execution process executed by the execution processor cluster in block 1010. Similarly, in response to determining that no other processor cluster has more available remote shared cache memory than the lowest latency processor cluster (i.e. determination block 1210="No"), the computing device may use the selected remote shared cache memory as the victim cache for the execution process executed by the execution processor cluster in block 1010.

Figure 13:
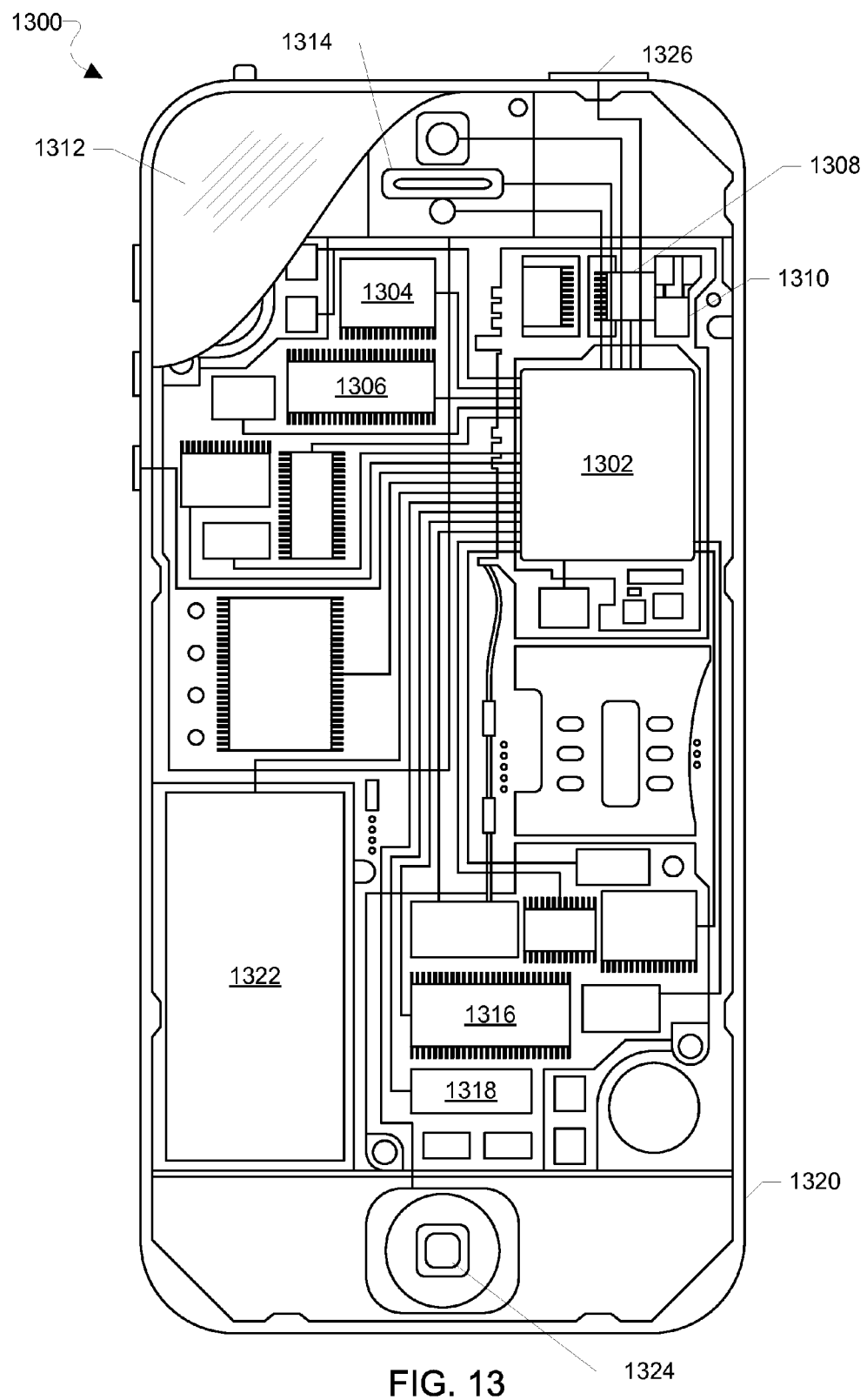
FIG. 13 is component block diagram illustrating an example mobile computing device suitable for use with the various aspects.

The various aspects (including, but not limited to, aspects discussed above with reference to FIGS. 1-12) may be implemented in a wide variety of computing systems, which may include an example mobile computing device suitable for use with the various aspects illustrated in FIG. 13. The mobile computing device 1300 may include a processor 1302 coupled to a touchscreen controller 1304 and an internal memory 1306. The processor 1302 may be one or more multicore integrated circuits designated for general or specific processing tasks. The internal memory 1306 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 1304 and the processor 1302 may also be coupled to a touchscreen panel 1312, such as a resistive-sensing touchscreen, capacitive-sensing touchscreen, infrared sensing touchscreen, etc. Additionally, the display of the computing device 1300 need not have touch screen capability.

The mobile computing device 1300 may have one or more radio signal transceivers 1308 (e.g., Peanut, Bluetooth, Zigbee, Wi-Fi, RF radio) and antennae 1310, for sending and receiving communications, coupled to each other and/or to the processor 1302. The transceivers 1308 and antennae 1310 may be used with the above-mentioned circuitry to implement the various wireless transmission protocol stacks and interfaces. The mobile computing device 1300 may include a cellular network wireless modem chip 1316 that enables communication via a cellular network and is coupled to the processor.

The mobile computing device 1300 may include a peripheral device connection interface 1318 coupled to the processor 1302. The peripheral device connection interface 1318 may be singularly configured to accept one type of connection, or may be configured to accept various types of physical and communication connections, common or proprietary, such as USB, FireWire, Thunderbolt, or PCIe. The peripheral device connection interface 1318 may also be coupled to a similarly configured peripheral device connection port (not shown).

The mobile computing device 1300 may also include speakers 1314 for providing audio outputs. The mobile computing device 1300 may also include a housing 1320, constructed of a plastic, metal, or a combination of materials, for containing all or some of the components discussed herein. The mobile computing device 1300 may include a power source 1322 coupled to the processor 1302, such as a disposable or rechargeable battery. The rechargeable battery may also be coupled to the peripheral device connection port to receive a charging current from a source external to the mobile computing device 1300. The mobile computing device 1300 may also include a physical button 1324 for receiving user inputs. The mobile computing device 1300 may also include a power button 1326 for turning the mobile computing device 1300 on and off.

Figure 14:
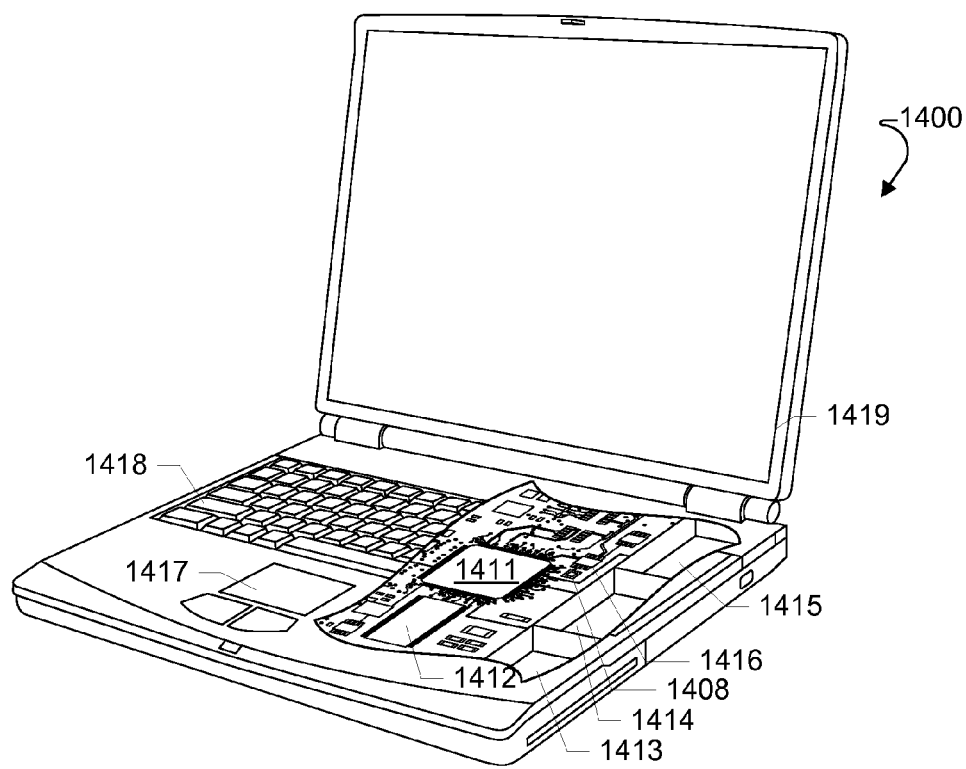
FIG. 14 is component block diagram illustrating an example mobile computing device suitable for use with the various aspects.

The various aspects (including, but not limited to, aspects discussed above with reference to FIGS. 1-12) may be implemented in a wide variety of computing systems, which may include a variety of mobile computing devices, such as a laptop computer 1400 illustrated in FIG. 14. Many laptop computers include a touchpad touch surface 1417 that serves as the computer's pointing device, and thus may receive drag, scroll, and flick gestures similar to those implemented on computing devices equipped with a touch screen display and described above. A laptop computer 1400 will typically include a processor 1411 coupled to volatile memory 1412 and a large capacity nonvolatile memory, such as a disk drive 1413 of Flash memory. Additionally, the computer 1400 may have one or more antenna 1408 for sending and receiving electromagnetic radiation that may be connected to a wireless data link and/or cellular telephone transceiver 1406 coupled to the processor 1411. The computer 1400 may also include a floppy disc drive 1414 and a compact disc (CD) drive 1415 coupled to the processor 1411. In a notebook configuration, the computer housing includes the touchpad 1417, the keyboard 1418, and the display 1419 all coupled to the processor 1411. Other configurations of the computing device may include a computer mouse or trackball coupled to the processor (e.g., via a USB input) as are well known, which may also be used in conjunction with the various aspects.

Figure 15:
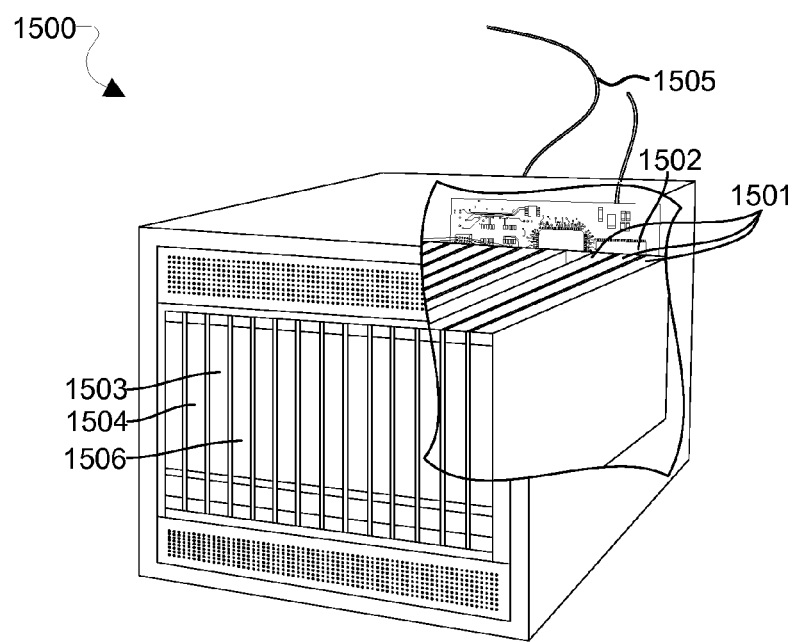
FIG. 15 is component block diagram illustrating an example server suitable for use with the various aspects.

The various aspects (including, but not limited to, aspects discussed above with reference to FIGS. 1-12) may be implemented in a wide variety of computing systems, which may include any of a variety of commercially available servers for compressing data in server cache memory. An example server 1500 is illustrated in FIG. 15. Such a server 1500 typically includes one or more multi-core processor assemblies 1501 coupled to volatile memory 1502 and a large capacity nonvolatile memory, such as a disk drive 1504. As illustrated in FIG. 15, multi-core processor assemblies 1501 may be added to the server 1500 by inserting them into the racks of the assembly. The server 1500 may also include a floppy disc drive, compact disc (CD) or DVD disc drive 1506 coupled to the processor 1501. The server 1500 may also include network access ports 1503 coupled to the multi-core processor assemblies 1501 for establishing network interface connections with a network 1505, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Many computing devices operating system kernels are organized into a user space (where non-privileged code runs) and a kernel space (where privileged code runs). This separation is of particular importance in Android and other general public license (GPL) environments in which code that is part of the kernel space must be GPL licensed, while code running in the user-space may not be GPL licensed. It should be understood that the various software components/modules discussed here may be implemented in either the kernel space or the user space, unless expressly stated otherwise.

The foregoing method descriptions and the process flow diagrams are provided merely as illustrative examples and are not intended to require or imply that the operations of the various aspects must be performed in the order presented. As will be appreciated by one of skill in the art the order of operations in the foregoing aspects may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various aspects may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method for scheduling an execution process to an execution processor cluster to take advantage of reduced latency with a victim cache, comprising:
   determining a first processor cluster with a first remote shared cache memory having an available shared cache memory space;
   determining a second processor cluster with a lower latency to the first remote shared cache memory than a first execution processor cluster scheduled with the execution process;
   scheduling the execution process to the second processor cluster as a second execution processor cluster based on a size of the available shared cache memory space and the latency of the second processor cluster to the first remote shared cache memory; and
   using the available shared cache memory space as the victim cache for the execution process.

2. The method of claim 1, wherein:
   determining a first processor cluster with a first remote shared cache memory having an available shared cache memory space comprises determining the first processor cluster with the first remote shared cache memory having a highest amount of available shared cache memory space;
   determining a second processor cluster with a lower latency to the first remote shared cache memory than a first execution processor cluster scheduled with the execution process comprises determining the second processor cluster with a lowest latency to the first remote shared cache memory; and
   scheduling the execution process to the second processor cluster as a second execution processor cluster based on a size of the available shared cache memory space and the latency of the second processor cluster to the first remote shared cache memory comprises scheduling the execution process to the second processor cluster as a second execution processor cluster based on the second processor cluster having the lowest latency to the first remote shared cache memory having the highest amount of available shared cache memory space.

3. The method of claim 1, further comprising:
   determining whether a process is scheduled for the second processor cluster; and
   scheduling the process to the first execution processor cluster as a third processor cluster in response to determining that the process is scheduled for the second processor cluster.

4. The method of claim 1, further comprising:
   determining a third processor cluster with a second remote shared cache memory having a highest amount of available shared cache memory space wherein the second remote shared cache memory includes any remote shared cache memory other than the first remote shared cache memory;
   determining a fourth processor cluster having a lowest latency to the second execution processor cluster wherein the fourth processor cluster includes any processor cluster other than the first processor cluster;
   scheduling a first process scheduled for the third processor cluster to the fourth processor cluster; and
   using the highest amount of available shared cache memory space as part of the victim cache for the execution process.

5. The method of claim 4, further comprising:
   determining whether a second process is scheduled for the fourth processor cluster; and
   scheduling the second process to the third processor cluster in response to determining that the second process is scheduled for the fourth processor cluster.

6. A computing device, comprising:
   a plurality of processor clusters communicatively connected to each other;
   a first execution processor cluster of the plurality of processor clusters scheduled with an execution process;
   a plurality of shared cache memories each communicatively connected to at least one of the plurality of processor clusters; and
   a processor communicatively connected to the plurality of processor clusters and configured with processor-executable instructions to perform operations comprising:
      determining a first processor cluster with a first remote shared cache memory having an available shared cache memory space;
      determining a second processor cluster with a lower latency to the first remote shared cache memory than the first execution processor cluster scheduled with the execution process;
      scheduling the execution process to the second processor cluster as a second execution processor cluster based on a size of the available shared cache memory space and the latency of the second processor cluster to the first remote shared cache memory; and
      using the available shared cache memory space as a victim cache for the execution process.

7. The computing device of claim 6, wherein the processor is further configured with processor-executable instructions to perform operations such that:
   determining a first processor cluster with a first remote shared cache memory having an available shared cache memory space comprises determining the first processor cluster with the first remote shared cache memory having a highest amount of available shared cache memory space;

determining a second processor cluster with a lower latency to the first remote shared cache memory than the first execution processor cluster scheduled with the execution process comprises determining the second processor cluster with a lowest latency to the first remote shared cache memory; and scheduling the execution process to the second processor cluster as a second execution processor cluster based on a size of the available shared cache memory space and the latency of the second processor cluster to the first remote shared cache memory comprises scheduling the execution process to the second processor cluster as a second execution processor cluster based on the second processor cluster having the lowest latency to the first remote shared cache memory having the highest amount of available shared cache memory space.

8. The computing device of claim 6, wherein the processor is further configured with processor-executable instructions to perform operations comprising:
determining whether a process is scheduled for the second processor cluster; and
scheduling the process to the first execution processor cluster as a third processor cluster in response to determining that the process is scheduled for the second processor cluster.

9. The computing device of claim 6, wherein the processor is further configured with processor-executable instructions to perform operations comprising:
determining a third processor cluster with a second remote shared cache memory having a highest amount of available shared cache memory space wherein the second remote shared cache memory includes any remote shared cache memory other than the first remote shared cache memory;
determining a fourth processor cluster having a lowest latency to the second execution processor cluster wherein the fourth processor cluster includes any processor cluster other than the first processor cluster;
scheduling a first process scheduled for the third processor cluster to the fourth processor cluster; and
using the highest amount of available shared cache memory space as part of the victim cache for the execution process.

10. The computing device of claim 9, wherein the processor is further configured with processor-executable instructions to perform operations comprising:
determining whether a second process is scheduled for the fourth processor cluster; and
scheduling the second process to the third processor cluster in response to determining that the second process is scheduled for the fourth processor cluster.

11. A computing device, comprising:
means for determining a first processor cluster with a first remote shared cache memory having an available shared cache memory space;
means for determining a second processor cluster with a lower latency to the first remote shared cache memory than a first execution processor cluster scheduled with an execution process;
means for scheduling the execution process to the second processor cluster as a second execution processor cluster based on a size of the available shared cache memory space and the latency of the second processor cluster to the first remote shared cache memory; and
means for using the available shared cache memory space as a victim cache for the execution process.

12. The computing device of claim 11, wherein:
means for determining a first processor cluster with a first remote shared cache memory having an available shared cache memory space comprises means for determining the first processor cluster with the first remote shared cache memory having a highest amount of available shared cache memory space;
means for determining a second processor cluster with a lower latency to the first remote shared cache memory than a first execution processor cluster scheduled with the execution process comprises means for determining the second processor cluster with a lowest latency to the first remote shared cache memory; and
means for scheduling the execution process to the second processor cluster as a second execution processor cluster based on a size of the available shared cache memory space and the latency of the second processor cluster to the first remote shared cache memory comprises means for scheduling the execution process to the second processor cluster as a second execution processor cluster based on the second processor cluster having the lowest latency to the first remote shared cache memory having the highest amount of available shared cache memory space.

13. The computing device of claim 11, further comprising:
means for determining whether a process is scheduled for the second processor cluster; and
means for scheduling the process to the first execution processor cluster as a third processor cluster in response to determining that the process is scheduled for the second processor cluster.

14. The computing device of claim 11, further comprising:
means for determining a third processor cluster with a second remote shared cache memory having a highest amount of available shared cache memory space wherein the second remote shared cache memory includes any remote shared cache memory other than the first remote shared cache memory;
means for determining a fourth processor cluster having a lowest latency to the second execution processor cluster wherein the fourth processor cluster includes any processor cluster other than the first processor cluster;
means for scheduling a first process scheduled for the third processor cluster to the fourth processor cluster; and
means for using the highest amount of available shared cache memory space as part of the victim cache for the execution process.

15. The computing device of claim 14, further comprising:
means for determining whether a second process is scheduled for the fourth processor cluster; and
means for scheduling the second process to the third processor cluster in response to determining that the second process is scheduled for the fourth processor cluster.

16. A non-transitory processor-readable medium having stored thereon processor-executable instructions configured to cause a processor to perform operations comprising:
determining a first processor cluster with a first remote shared cache memory having an available shared cache memory space;
determining a second processor cluster with a lower latency to the first remote shared cache memory than a first execution processor cluster scheduled with an execution process;

scheduling the execution process to the second processor cluster as a second execution processor cluster based on a size of the available shared cache memory space and the latency of the second processor cluster to the first remote shared cache memory; and using the available shared cache memory space as a victim cache for the execution process.

17. The non-transitory processor-readable medium of claim 16, wherein the stored processor-executable instructions are configured to cause the processor to perform operations such that:

determining a first processor cluster with a first remote shared cache memory having an available shared cache memory space comprises determining the first processor cluster with the first remote shared cache memory having a highest amount of available shared cache memory space;

determining a second processor cluster with a lower latency to the first remote shared cache memory than a first execution processor cluster scheduled with the execution process comprises determining the second processor cluster with a lowest latency to the first remote shared cache memory; and scheduling the execution process to the second processor cluster as a second execution processor cluster based on a size of the available shared cache memory space and the latency of the second processor cluster to the first remote shared cache memory comprises scheduling the execution process to the second processor cluster as a second execution processor cluster based on the second processor cluster having the lowest latency to the first remote shared cache memory having the highest amount of available shared cache memory space.

18. The non-transitory processor-readable medium of claim 16, wherein the stored processor-executable instructions are configured to cause the processor to perform operations further comprising:

determining whether a process is scheduled for the second processor cluster; and scheduling the process to the first execution processor cluster as a third processor cluster in response to determining that the process is scheduled for the second processor cluster.

19. The non-transitory processor-readable medium of claim 16, wherein the stored processor-executable instructions are configured to cause the processor to perform operations further comprising:

determining a third processor cluster with a second remote shared cache memory having a highest amount of available shared cache memory space wherein the second remote shared cache memory includes any remote shared cache memory other than the first remote shared cache memory;

determining a fourth processor cluster having a lowest latency to the second execution processor cluster wherein the fourth processor cluster includes any processor cluster other than the first processor cluster;

scheduling a first process scheduled for the third processor cluster to the fourth processor cluster; and using the highest amount of available shared cache memory space as part of the victim cache for the execution process.

20. The non-transitory processor-readable medium of claim 19, wherein the stored processor-executable instructions are configured to cause the processor to perform operations further comprising:

determining whether a second process is scheduled for the fourth processor cluster; and scheduling the second process to the third processor cluster in response to determining that the second process is scheduled for the fourth processor cluster.

* * * * *